(12) United States Patent
Tarricone et al.

(10) Patent No.: US 9,240,941 B2
(45) Date of Patent: Jan. 19, 2016

(54) SYSTEM AND METHOD FOR MANAGING MEDIA IN A DISTRIBUTED COMMUNICATION NETWORK

(71) Applicant: Twilio, Inc., San Francisco, CA (US)

(72) Inventors: Brian Tarricone, San Francisco, CA (US); John Wolthuis, San Francisco, CA (US); Jonas Boerjesson, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 76 days.

(21) Appl. No.: 14/278,993

(22) Filed: May 15, 2014

(65) Prior Publication Data

US 2014/0289420 A1 Sep. 25, 2014

Related U.S. Application Data

(63) Continuation-in-part of application No. 14/176,458, filed on Feb. 10, 2014, which is a continuation of application No. 13/891,111, filed on May 9, 2013, now abandoned.

(60) Provisional application No. 61/644,886, filed on May 9, 2012, provisional application No. 61/823,837, filed on May 15, 2013.

(51) Int. Cl.
*H04L 12/751* (2013.01)
*H04L 29/06* (2006.01)
*H04L 12/721* (2013.01)

(52) U.S. Cl.
CPC .............. *H04L 45/02* (2013.01); *H04L 45/124* (2013.01); *H04L 65/103* (2013.01); *H04L 65/1006* (2013.01); *H04L 65/1069* (2013.01); *H04L 65/80* (2013.01); *H04L 69/24* (2013.01)

(58) Field of Classification Search
USPC .......................................................... 375/352
See application file for complete search history.

(56) References Cited

U.S. PATENT DOCUMENTS 5,274,700 A 12/1993 Gechter et al.
5,526,416 A 6/1996 Dezonno et al.
(Continued)

FOREIGN PATENT DOCUMENTS

DE 1684587 A 3/1971
EP 0282126 A 9/1988
(Continued)

OTHER PUBLICATIONS

Complaint for Patent Infringement, *Telinit Technologies, LLC* v. *Twilio Inc.*, dated Oct. 12, 2012.
(Continued)

*Primary Examiner* — Bunjob Jaroenchonwanit
(74) *Attorney, Agent, or Firm* — Jeffrey Schox

(57) ABSTRACT

A system and method for processing communication media in a regionally distributed communication platform that includes at a first platform region, establishing a communication session comprising establishing a media communication to at least one endpoint from the first region and establishing signaling communication to a second platform region; selecting a media resource in response to a change in media processing requirements of the communication session; when the selected media resource is outside the first region, routing media communication through a media resource outside of the first region; when the media resource is available in the first region, routing media communication through the media resource of the first region; and when the media resource is outside of the second region, storing the media communication in the first region at least temporarily and tunneling a branch of the media communication to a central media service in the second region.

20 Claims, 25 Drawing Sheets

(56) References Cited

U.S. PATENT DOCUMENTS

| | | | | |
|---|---|---|---|---|
| 5,581,608 | A | 12/1996 | Jreij et al. | |
| 5,598,457 | A | 1/1997 | Foladare et al. | |
| 5,934,181 | A | 8/1999 | Adamczewski | |
| 6,026,440 | A | 2/2000 | Shrader et al. | |
| 6,094,681 | A | 7/2000 | Shaffer et al. | |
| 6,138,143 | A | 10/2000 | Gigliotti et al. | |
| 6,185,565 | B1 | 2/2001 | Meubus et al. | |
| 6,192,123 | B1 | 2/2001 | Grunsted et al. | |
| 6,206,564 | B1 | 3/2001 | Adamczewski | |
| 6,223,287 | B1 | 4/2001 | Douglas et al. | |
| 6,269,336 | B1 | 7/2001 | Ladd et al. | |
| 6,373,836 | B1 | 4/2002 | Deryugin et al. | |
| 6,425,012 | B1 | 7/2002 | Trovato et al. | |
| 6,426,995 | B1 | 7/2002 | Kim et al. | |
| 6,430,175 | B1 | 8/2002 | Echols et al. | |
| 6,434,528 | B1 | 8/2002 | Sanders | |
| 6,445,694 | B1 | 9/2002 | Swartz | |
| 6,445,776 | B1 | 9/2002 | Shank et al. | |
| 6,459,913 | B2 | 10/2002 | Cloutier | |
| 6,493,558 | B1 | 12/2002 | Bernhart et al. | |
| 6,496,500 | B2 | 12/2002 | Nance et al. | |
| 6,501,832 | B1 | 12/2002 | Saylor et al. | |
| 6,507,875 | B1 | 1/2003 | Mellen-Garnett et al. | |
| 6,577,721 | B1 | 6/2003 | Vainio et al. | |
| 6,600,736 | B1 | 7/2003 | Ball et al. | |
| 6,606,596 | B1 | 8/2003 | Zirngibl et al. | |
| 6,614,783 | B1 | 9/2003 | Sonesh et al. | |
| 6,625,258 | B1 | 9/2003 | Ram et al. | |
| 6,625,576 | B2 | 9/2003 | Kochanski et al. | |
| 6,636,504 | B1 * | 10/2003 | Albers et al. | 370/352 |
| 6,662,231 | B1 | 12/2003 | Drosset et al. | |
| 6,704,785 | B1 | 3/2004 | Koo et al. | |
| 6,707,889 | B1 | 3/2004 | Saylor et al. | |
| 6,711,249 | B2 | 3/2004 | Weissman et al. | |
| 6,738,738 | B2 | 5/2004 | Henton | |
| 6,757,365 | B1 | 6/2004 | Bogard | |
| 6,765,997 | B1 | 7/2004 | Zirngibl et al. | |
| 6,768,788 | B1 | 7/2004 | Langseth et al. | |
| 6,778,653 | B1 | 8/2004 | Kallas et al. | |
| 6,785,266 | B2 | 8/2004 | Swartz | |
| 6,788,768 | B1 | 9/2004 | Saylor et al. | |
| 6,792,086 | B1 | 9/2004 | Saylor et al. | |
| 6,792,093 | B2 | 9/2004 | Barak et al. | |
| 6,798,867 | B1 | 9/2004 | Zirngibl et al. | |
| 6,807,529 | B2 | 10/2004 | Johnson et al. | |
| 6,807,574 | B1 | 10/2004 | Partovi et al. | |
| 6,819,667 | B1 | 11/2004 | Brusilovsky et al. | |
| 6,820,260 | B1 | 11/2004 | Flockhart et al. | |
| 6,829,334 | B1 | 12/2004 | Zirngibl et al. | |
| 6,834,265 | B2 | 12/2004 | Balasuriya | |
| 6,836,537 | B1 | 12/2004 | Zirngibl et al. | |
| 6,842,767 | B1 | 1/2005 | Partovi et al. | |
| 6,850,603 | B1 | 2/2005 | Eberle et al. | |
| 6,870,830 | B1 | 3/2005 | Schuster et al. | |
| 6,873,952 | B1 | 3/2005 | Bailey et al. | |
| 6,874,084 | B1 | 3/2005 | Dobner et al. | |
| 6,885,737 | B1 | 4/2005 | Gao et al. | |
| 6,888,929 | B1 | 5/2005 | Saylor et al. | |
| 6,895,084 | B1 | 5/2005 | Saylor et al. | |
| 6,898,567 | B2 | 5/2005 | Balasuriya | |
| 6,912,581 | B2 | 6/2005 | Johnson et al. | |
| 6,922,411 | B1 | 7/2005 | Taylor | |
| 6,931,405 | B2 | 8/2005 | El-Shimi et al. | |
| 6,937,699 | B1 | 8/2005 | Schuster et al. | |
| 6,940,953 | B1 | 9/2005 | Eberle et al. | |
| 6,941,268 | B2 | 9/2005 | Porter et al. | |
| 6,947,417 | B2 | 9/2005 | Laursen et al. | |
| 6,947,988 | B1 | 9/2005 | Saleh | |
| 6,961,330 | B1 | 11/2005 | Cattan et al. | |
| 6,964,012 | B1 | 11/2005 | Zirngibl et al. | |
| 6,970,915 | B1 | 11/2005 | Partovi et al. | |
| 6,977,992 | B2 | 12/2005 | Zirngibl et al. | |
| 6,985,862 | B2 | 1/2006 | Stroem et al. | |
| 6,999,576 | B2 | 2/2006 | Sacra | |
| 7,003,464 | B2 | 2/2006 | Ferrans et al. | |
| 7,006,606 | B1 | 2/2006 | Cohen et al. | |
| 7,010,586 | B1 | 3/2006 | Allavarpu et al. | |
| 7,020,685 | B1 | 3/2006 | Chen et al. | |
| 7,039,165 | B1 | 5/2006 | Saylor et al. | |
| 7,062,709 | B2 | 6/2006 | Cheung | |
| 7,076,037 | B1 | 7/2006 | Gonen et al. | |
| 7,076,428 | B2 | 7/2006 | Anastasakos et al. | |
| 7,089,310 | B1 | 8/2006 | Ellerman et al. | |
| 7,103,003 | B2 | 9/2006 | Brueckheimer et al. | |
| 7,103,171 | B1 | 9/2006 | Annadata et al. | |
| 7,106,844 | B1 | 9/2006 | Holland | |
| 7,111,163 | B1 | 9/2006 | Haney | |
| 7,140,004 | B1 | 11/2006 | Kunins et al. | |
| 7,143,039 | B1 | 11/2006 | Stifelman et al. | |
| 7,197,331 | B2 | 3/2007 | Anastasakos et al. | |
| 7,197,461 | B1 | 3/2007 | Eberle et al. | |
| 7,197,462 | B2 | 3/2007 | Takagi et al. | |
| 7,197,544 | B2 | 3/2007 | Wang et al. | |
| 7,225,232 | B2 | 5/2007 | Elberse | |
| 7,227,849 | B1 | 6/2007 | Raesaenen | |
| 7,260,208 | B2 | 8/2007 | Cavalcanti | |
| 7,266,181 | B1 | 9/2007 | Zirngibl et al. | |
| 7,269,557 | B1 | 9/2007 | Bailey et al. | |
| 7,272,212 | B2 | 9/2007 | Eberle et al. | |
| 7,272,564 | B2 | 9/2007 | Phillips et al. | |
| 7,277,851 | B1 | 10/2007 | Henton | |
| 7,283,515 | B2 | 10/2007 | Fowler | |
| 7,286,521 | B1 | 10/2007 | Jackson et al. | |
| 7,287,248 | B1 | 10/2007 | Adeeb | |
| 7,289,453 | B2 | 10/2007 | Riedel et al. | |
| 7,296,739 | B1 | 11/2007 | Mo et al. | |
| 7,298,732 | B2 | 11/2007 | Cho | |
| 7,308,085 | B2 | 12/2007 | Weissman | |
| 7,308,408 | B1 | 12/2007 | Stifelman et al. | |
| 7,324,633 | B2 | 1/2008 | Gao et al. | |
| 7,324,942 | B1 | 1/2008 | Mahowald et al. | |
| 7,328,263 | B1 | 2/2008 | Sadjadi | |
| 7,330,463 | B1 * | 2/2008 | Bradd et al. | 370/352 |
| 7,330,890 | B1 | 2/2008 | Partovi et al. | |
| 7,340,040 | B1 | 3/2008 | Saylor et al. | |
| 7,349,714 | B2 | 3/2008 | Lee et al. | |
| 7,369,865 | B2 * | 5/2008 | Gabriel et al. | 455/466 |
| 7,373,660 | B1 | 5/2008 | Guichard et al. | |
| 7,376,223 | B2 | 5/2008 | Taylor et al. | |
| 7,376,586 | B1 | 5/2008 | Partovi et al. | |
| 7,376,733 | B2 | 5/2008 | Connelly et al. | |
| 7,376,740 | B1 | 5/2008 | Porter et al. | |
| 7,412,525 | B2 | 8/2008 | Cafarella et al. | |
| 7,428,302 | B2 | 9/2008 | Zirngibl et al. | |
| 7,440,898 | B1 | 10/2008 | Eberle et al. | |
| 7,447,299 | B1 | 11/2008 | Partovi et al. | |
| 7,454,459 | B1 | 11/2008 | Kapoor et al. | |
| 7,457,397 | B1 | 11/2008 | Saylor et al. | |
| 7,473,872 | B2 | 1/2009 | Takimoto | |
| 7,486,780 | B2 | 2/2009 | Zirngibl et al. | |
| 7,496,054 | B2 | 2/2009 | Taylor | |
| 7,500,249 | B2 | 3/2009 | Kampe et al. | |
| 7,505,951 | B2 | 3/2009 | Thompson et al. | |
| 7,519,359 | B2 | 4/2009 | Chiarulli et al. | |
| 7,522,614 | B1 * | 4/2009 | Aguinaga et al. | 370/401 |
| 7,522,711 | B1 | 4/2009 | Stein et al. | |
| 7,536,454 | B2 | 5/2009 | Balasuriya | |
| 7,552,054 | B1 | 6/2009 | Stifelman et al. | |
| 7,571,226 | B1 | 8/2009 | Partovi et al. | |
| 7,613,287 | B1 | 11/2009 | Stifelman et al. | |
| 7,623,648 | B1 | 11/2009 | Oppenheim et al. | |
| 7,630,900 | B1 | 12/2009 | Strom | |
| 7,631,310 | B1 | 12/2009 | Henzinger | |
| 7,644,000 | B1 | 1/2010 | Strom | |
| 7,657,433 | B1 | 2/2010 | Chang | |
| 7,657,434 | B2 | 2/2010 | Thompson et al. | |
| 7,668,157 | B2 | 2/2010 | Weintraub et al. | |
| 7,668,302 | B1 * | 2/2010 | Beene et al. | 379/114.02 |
| 7,672,295 | B1 | 3/2010 | Andhare et al. | |
| 7,675,857 | B1 | 3/2010 | Chesson | |
| 7,676,221 | B2 | 3/2010 | Roundtree et al. | |
| 7,715,547 | B2 | 5/2010 | Ibbotson et al. | |
| 7,779,065 | B2 | 8/2010 | Gupta et al. | |
| 7,875,836 | B2 | 1/2011 | Imura et al. | |

(56) References Cited

U.S. PATENT DOCUMENTS

| | | | |
|---|---|---|---|
| 7,882,253 B2 | 2/2011 | Pardo-Castellote et al. | |
| 7,899,167 B1 * | 3/2011 | Rae | 379/189 |
| 7,920,866 B2 | 4/2011 | Bosch et al. | |
| 7,926,099 B1 | 4/2011 | Chakravarty et al. | |
| 7,936,867 B1 | 5/2011 | Hill et al. | |
| 7,962,644 B1 | 6/2011 | Ezerzer et al. | |
| 7,979,555 B2 | 7/2011 | Rothstein et al. | |
| 8,000,269 B1 * | 8/2011 | Rae et al. | 370/269 |
| 8,023,425 B2 | 9/2011 | Raleigh | |
| 8,069,096 B1 | 11/2011 | Ballaro et al. | |
| 8,081,958 B2 | 12/2011 | Soederstroem et al. | |
| 8,103,725 B2 | 1/2012 | Gupta et al. | |
| 8,126,128 B1 | 2/2012 | Hicks, III et al. | |
| 8,149,716 B2 | 4/2012 | Ramanathan et al. | |
| 8,150,918 B1 | 4/2012 | Edelman et al. | |
| 8,156,213 B1 | 4/2012 | Deng et al. | |
| 8,196,133 B2 | 6/2012 | Kakumani et al. | |
| 8,233,611 B1 | 7/2012 | Zettner | |
| 8,243,889 B2 | 8/2012 | Taylor et al. | |
| 8,266,327 B2 | 9/2012 | Kumar et al. | |
| 8,295,272 B2 | 10/2012 | Boni et al. | |
| 8,306,021 B2 | 11/2012 | Lawson et al. | |
| 8,326,805 B1 | 12/2012 | Arous et al. | |
| 8,346,630 B1 | 1/2013 | McKeown | |
| 8,355,394 B2 | 1/2013 | Taylor et al. | |
| 8,417,817 B1 | 4/2013 | Jacobs | |
| 8,429,827 B1 | 4/2013 | Wetzel | |
| 8,438,315 B1 | 5/2013 | Tao et al. | |
| 8,462,670 B2 | 6/2013 | Chien et al. | |
| 8,509,068 B2 | 8/2013 | Begall et al. | |
| 8,532,686 B2 | 9/2013 | Schmidt et al. | |
| 8,542,805 B2 | 9/2013 | Agranovsky et al. | |
| 8,594,626 B1 | 11/2013 | Woodson et al. | |
| 8,611,338 B2 | 12/2013 | Lawson et al. | |
| 8,649,268 B2 | 2/2014 | Lawson et al. | |
| 8,667,056 B1 | 3/2014 | Proulx et al. | |
| 8,675,493 B2 | 3/2014 | Buddhikot et al. | |
| 8,755,376 B2 | 6/2014 | Lawson et al. | |
| 8,806,024 B1 | 8/2014 | Francis et al. | |
| 8,837,465 B2 | 9/2014 | Lawson et al. | |
| 8,838,707 B2 | 9/2014 | Lawson et al. | |
| 9,014,664 B2 | 4/2015 | Kim et al. | |
| 9,015,702 B2 | 4/2015 | Bhat | |
| 2001/0038624 A1 | 11/2001 | Greenberg et al. | |
| 2001/0043684 A1 | 11/2001 | Guedalia et al. | |
| 2002/0006124 A1 | 1/2002 | Jimenez et al. | |
| 2002/0006125 A1 | 1/2002 | Josse et al. | |
| 2002/0006193 A1 | 1/2002 | Rodenbusch et al. | |
| 2002/0067823 A1 | 6/2002 | Walker et al. | |
| 2002/0077833 A1 | 6/2002 | Arons et al. | |
| 2002/0126813 A1 | 9/2002 | Partovi et al. | |
| 2002/0136391 A1 | 9/2002 | Armstrong | |
| 2002/0165957 A1 | 11/2002 | Devoe et al. | |
| 2002/0176378 A1 | 11/2002 | Hamilton et al. | |
| 2002/0198941 A1 | 12/2002 | Gavrilescu et al. | |
| 2003/0006137 A1 | 1/2003 | Wei et al. | |
| 2003/0014665 A1 | 1/2003 | Anderson et al. | |
| 2003/0018830 A1 | 1/2003 | Chen et al. | |
| 2003/0026426 A1 | 2/2003 | Wright et al. | |
| 2003/0039241 A1 * | 2/2003 | Park et al. | 370/352 |
| 2003/0046366 A1 | 3/2003 | Pardikar et al. | |
| 2003/0051037 A1 | 3/2003 | Sundaram et al. | |
| 2003/0058884 A1 * | 3/2003 | Kallner et al. | 370/465 |
| 2003/0059020 A1 | 3/2003 | Meyerson et al. | |
| 2003/0060188 A1 | 3/2003 | Gidron et al. | |
| 2003/0061317 A1 | 3/2003 | Brown et al. | |
| 2003/0061404 A1 | 3/2003 | Atwal et al. | |
| 2003/0088421 A1 | 5/2003 | Maes et al. | |
| 2003/0103620 A1 | 6/2003 | Brown et al. | |
| 2003/0123640 A1 | 7/2003 | Roelle et al. | |
| 2003/0195990 A1 * | 10/2003 | Greenblat | 709/251 |
| 2003/0196076 A1 * | 10/2003 | Zabarski et al. | 712/234 |
| 2003/0211842 A1 | 11/2003 | Kempf et al. | |
| 2003/0231647 A1 | 12/2003 | Petrovykh | |
| 2004/0011690 A1 | 1/2004 | Marfino et al. | |
| 2004/0044953 A1 | 3/2004 | Watkins et al. | |
| 2004/0052349 A1 * | 3/2004 | Creamer et al. | 379/201.01 |
| 2004/0071275 A1 | 4/2004 | Bowater et al. | |
| 2004/0101122 A1 | 5/2004 | Da Palma et al. | |
| 2004/0102182 A1 | 5/2004 | Reith et al. | |
| 2004/0165569 A1 | 8/2004 | Sweatman et al. | |
| 2004/0172482 A1 | 9/2004 | Weissman et al. | |
| 2004/0205689 A1 | 10/2004 | Ellens et al. | |
| 2004/0213400 A1 | 10/2004 | Golitsin et al. | |
| 2004/0218748 A1 | 11/2004 | Fisher | |
| 2004/0228469 A1 | 11/2004 | Andrews et al. | |
| 2004/0240649 A1 | 12/2004 | Goel | |
| 2005/0005200 A1 | 1/2005 | Matena et al. | |
| 2005/0010483 A1 | 1/2005 | Ling | |
| 2005/0021626 A1 | 1/2005 | Prajapat et al. | |
| 2005/0025303 A1 | 2/2005 | Hostetler | |
| 2005/0038772 A1 | 2/2005 | Colrain | |
| 2005/0043952 A1 | 2/2005 | Sharma et al. | |
| 2005/0047579 A1 * | 3/2005 | Salame | 379/265.09 |
| 2005/0091572 A1 | 4/2005 | Gavrilescu et al. | |
| 2005/0125251 A1 | 6/2005 | Berger et al. | |
| 2005/0128961 A1 | 6/2005 | Miloslavsky et al. | |
| 2005/0135578 A1 | 6/2005 | Ress et al. | |
| 2005/0141500 A1 | 6/2005 | Bhandari et al. | |
| 2005/0147088 A1 | 7/2005 | Bao et al. | |
| 2005/0177635 A1 | 8/2005 | Schmidt et al. | |
| 2005/0181835 A1 | 8/2005 | Lau et al. | |
| 2005/0228680 A1 | 10/2005 | Malik | |
| 2005/0238153 A1 | 10/2005 | Chevalier | |
| 2005/0240659 A1 | 10/2005 | Taylor | |
| 2005/0243977 A1 | 11/2005 | Creamer et al. | |
| 2005/0246176 A1 | 11/2005 | Creamer et al. | |
| 2005/0289222 A1 | 12/2005 | Sahim | |
| 2006/0008073 A1 | 1/2006 | Yoshizawa et al. | |
| 2006/0015467 A1 | 1/2006 | Morken et al. | |
| 2006/0047666 A1 | 3/2006 | Bedi et al. | |
| 2006/0067506 A1 | 3/2006 | Flockhart et al. | |
| 2006/0129638 A1 | 6/2006 | Deakin | |
| 2006/0143007 A1 | 6/2006 | Koh et al. | |
| 2006/0168334 A1 | 7/2006 | Potti et al. | |
| 2006/0203979 A1 | 9/2006 | Jennings | |
| 2006/0209695 A1 | 9/2006 | Archer et al. | |
| 2006/0212865 A1 | 9/2006 | Vincent et al. | |
| 2006/0215824 A1 | 9/2006 | Mitby et al. | |
| 2006/0217823 A1 | 9/2006 | Hussey | |
| 2006/0217978 A1 | 9/2006 | Mitby et al. | |
| 2006/0222166 A1 | 10/2006 | Ramakrishna et al. | |
| 2006/0256816 A1 | 11/2006 | Yarlagadda et al. | |
| 2006/0262915 A1 | 11/2006 | Marascio et al. | |
| 2006/0270386 A1 | 11/2006 | Yu et al. | |
| 2006/0285489 A1 | 12/2006 | Francisco et al. | |
| 2007/0002744 A1 | 1/2007 | Mewhinney et al. | |
| 2007/0036143 A1 | 2/2007 | Alt et al. | |
| 2007/0050306 A1 | 3/2007 | Mcqueen | |
| 2007/0070906 A1 | 3/2007 | Thakur | |
| 2007/0070980 A1 | 3/2007 | Phelps et al. | |
| 2007/0071223 A1 | 3/2007 | Lee et al. | |
| 2007/0074174 A1 | 3/2007 | Thornton | |
| 2007/0121651 A1 | 5/2007 | Casey et al. | |
| 2007/0127691 A1 | 6/2007 | Lert | |
| 2007/0127703 A1 | 6/2007 | Siminoff | |
| 2007/0130260 A1 | 6/2007 | Weintraub et al. | |
| 2007/0133771 A1 | 6/2007 | Stifelman et al. | |
| 2007/0149166 A1 | 6/2007 | Turcotte et al. | |
| 2007/0153711 A1 | 7/2007 | Dykas et al. | |
| 2007/0167170 A1 * | 7/2007 | Fitchett et al. | 455/456.1 |
| 2007/0192629 A1 | 8/2007 | Saito | |
| 2007/0208862 A1 | 9/2007 | Fox et al. | |
| 2007/0232284 A1 | 10/2007 | Mason et al. | |
| 2007/0242626 A1 | 10/2007 | Altberg et al. | |
| 2007/0265073 A1 | 11/2007 | Novi et al. | |
| 2007/0286180 A1 | 12/2007 | Marquette et al. | |
| 2007/0291905 A1 | 12/2007 | Halliday et al. | |
| 2007/0293200 A1 | 12/2007 | Roundtree et al. | |
| 2007/0295803 A1 * | 12/2007 | Levine et al. | 235/379 |
| 2008/0005275 A1 | 1/2008 | Overton et al. | |
| 2008/0025320 A1 * | 1/2008 | Bangalore et al. | 370/395.52 |
| 2008/0037715 A1 * | 2/2008 | Prozeniuk et al. | 379/45 |
| 2008/0037746 A1 | 2/2008 | Dufrene et al. | |

(56) References Cited

U.S. PATENT DOCUMENTS

| | | |
|---|---|---|
| 2008/0040484 A1 | 2/2008 | Yardley |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0101577 A1* | 5/2008 | Frankel ............... 379/202.01 |
| 2008/0104348 A1 | 5/2008 | Kabzinski et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0159508 A1* | 7/2008 | Lee et al. ............... 379/202.01 |
| 2008/0162482 A1 | 7/2008 | Ahern et al. |
| 2008/0165708 A1 | 7/2008 | Moore et al. |
| 2008/0170499 A1* | 7/2008 | Cozens et al. ............ 370/230.1 |
| 2008/0177883 A1 | 7/2008 | Hanai et al. |
| 2008/0209050 A1 | 8/2008 | Li |
| 2008/0222656 A1 | 9/2008 | Lyman |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0232289 A1 | 9/2009 | Drucker et al. |
| 2009/0235349 A1 | 9/2009 | Lai et al. |
| 2009/0252159 A1 | 10/2009 | Lawson et al. |
| 2009/0276771 A1 | 11/2009 | Nickolov et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0037204 A1 | 2/2010 | Lin et al. |
| 2010/0070424 A1 | 3/2010 | Monk |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0115041 A1 | 5/2010 | Hawkins et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0186022 A1* | 7/2010 | Oulid-Aissa et al. ......... 719/318 |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1* | 8/2010 | Ansari et al. ............... 709/218 |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0251329 A1 | 9/2010 | Wei |
| 2010/0251340 A1 | 9/2010 | Martin et al. |
| 2010/0281108 A1 | 11/2010 | Cohen |
| 2010/0290365 A1* | 11/2010 | Kwong et al. ............... 370/254 |
| 2010/0291910 A1 | 11/2010 | Sanding et al. |
| 2011/0029882 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110276 A1* | 5/2011 | Rae .............................. 370/260 |
| 2011/0110366 A1 | 5/2011 | Moore et al. |
| 2011/0131293 A1 | 6/2011 | Mori |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0177818 A1* | 7/2011 | Heit et al. .................. 455/436 |
| 2011/0189985 A1* | 8/2011 | Gao et al. .................. 455/422.1 |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0265172 A1 | 10/2011 | Sharma et al. |
| 2011/0267985 A1* | 11/2011 | Wilkinson et al. ........... 370/259 |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0310902 A1 | 12/2011 | Xu |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0079066 A1 | 3/2012 | Li et al. |
| 2012/0083266 A1 | 4/2012 | VanSwol et al. |
| 2012/0110564 A1 | 5/2012 | Ran et al. |
| 2012/0113978 A1* | 5/2012 | Cerami et al. ............... 370/352 |
| 2012/0114112 A1 | 5/2012 | Rauschenberger et al. |
| 2012/0149404 A1 | 6/2012 | Beattie et al. |
| 2012/0173610 A1 | 7/2012 | Bleau et al. |
| 2012/0174095 A1 | 7/2012 | Natchadalingam et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0226579 A1 | 9/2012 | Ha et al. |
| 2012/0239757 A1 | 9/2012 | Firstenberg et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0294147 A1* | 11/2012 | Ajero et al. ................... 370/230 |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0054684 A1 | 2/2013 | Brazier et al. |
| 2013/0058262 A1 | 3/2013 | Parreira |
| 2013/0067448 A1 | 3/2013 | Sannidhanam et al. |
| 2013/0156024 A1 | 6/2013 | Burg |
| 2013/0185153 A1* | 7/2013 | Howcroft .................... 705/14.53 |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0304929 A1* | 11/2013 | Fahlgren et al. ............ 709/227 |

(56) References Cited

U.S. PATENT DOCUMENTS

| | | |
|---|---|---|
| 2014/0045456 A1* | 2/2014 | Ballai et al. .................. 455/410 |
| 2014/0064467 A1 | 3/2014 | Lawson et al. |
| 2014/0105372 A1 | 4/2014 | Nowack et al. |
| 2014/0106704 A1 | 4/2014 | Cooke et al. |
| 2014/0123187 A1 | 5/2014 | Reisman |
| 2014/0129363 A1 | 5/2014 | Lorah et al. |
| 2014/0153565 A1 | 6/2014 | Lawson et al. |
| 2014/0153566 A1* | 6/2014 | Fahlgren et al. ............. 370/352 |
| 2014/0185490 A1 | 7/2014 | Holm et al. |
| 2014/0254600 A1 | 9/2014 | Shibata et al. |
| 2014/0274086 A1 | 9/2014 | Boerjesson et al. |
| 2014/0282473 A1 | 9/2014 | Saraf et al. |
| 2014/0355600 A1 | 12/2014 | Lawson et al. |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0181631 A1 | 6/2015 | Lee et al. |

FOREIGN PATENT DOCUMENTS

| | | |
|---|---|---|
| EP | 1464418 A | 10/2004 |
| EP | 1522922 A2 | 4/2005 |
| EP | 1770586 A1 | 4/2007 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 2006037492 A | 4/2006 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

OTHER PUBLICATIONS

RFC 3986: Uniform Resource Identifier (URI): Generic Syntax; T. Berners-Lee, R. Fielding, L. Masinter; Jan. 2005; The Internet Society.

* cited by examiner

SYSTEM AND METHOD FOR MANAGING MEDIA IN A DISTRIBUTED COMMUNICATION NETWORK

CROSS-REFERENCE TO RELATED APPLICATIONS

This application is a continuation-in-part of prior U.S. application Ser. No. 14/176,458, filed on 10 Feb. 2014, which is a continuation of prior U.S. application Ser. No. 13/891, 111, filed on 9 May 2013, which claims the benefit of U.S. Provisional Application Ser. No. 61/644,886, filed on 9 May 2012, all of which are incorporated in their entirety by this reference.

This application also claims the benefit of U.S. Provisional Application Ser. No. 61/823,837, filed on 15 May 2013, which is incorporated in its entirety by this reference.

TECHNICAL FIELD

This invention relates generally to the telephony field, and more specifically to a new and useful system and method for managing media in a distributed communication network.

BACKGROUND

In recent years, innovations in the web application and Voice over Internet Protocol (VOIP) have brought about considerable changes to the capabilities offered through traditional phone and communication services. In some distributed or cloud-based telephony systems, the routing of audio, video, or other media files can be determined or limited by the location and/or availability of the appropriate computing resources. In some instances, some or all of the callers reside in the same region, country, or continent as the bulk of the computing resources, thereby promoting increased call quality. However, if one or more of the parties to the call is located in a different region, country, or continent, then it is not readily apparent which computing resources should be utilized. Similarly, if the platform infrastructure is based in one region, communication outside of that region will be poor quality. For example, if the two callers reside in different countries, it might be unclear which of many computing resources should be allocated to the particular session. Furthermore, as more communication platforms are supported by cloud computing services located in distinct areas, core-computing infrastructure may be limited to particular locations. Accordingly, there is a need in the art for determining the shortest, highest quality, and/or optimized route for session traffic in a globally distributed telephony system. This invention provides such a new and useful system and method, described in detail below with reference to the appended figures.

DESCRIPTION OF THE PREFERRED EMBODIMENTS

The following description of preferred embodiments of the invention is not intended to limit the invention to these preferred embodiments, but rather to enable any person skilled in the art to make and use this invention.

Preferred System

Figure 1:
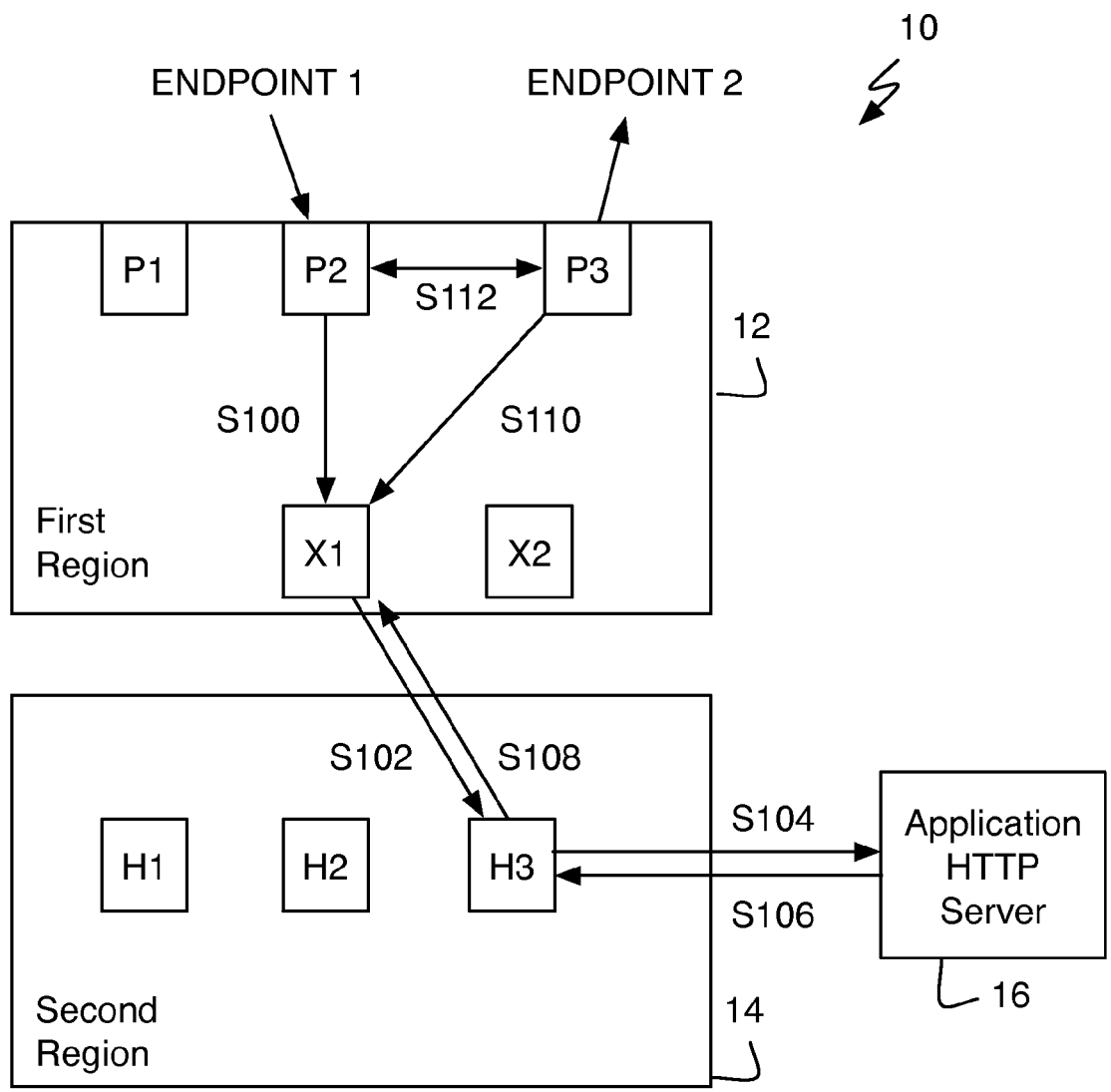
FIG. 1 is a schematic block diagram of a system and method for managing latency in a distributed telephony network in accordance with a preferred embodiment of the present invention.

As shown in FIG. 1, a system 10 of the preferred embodiment is configured for managing a distributed communication network operation in at least two regions 12, 14. The preferred system 10 can be used with any suitable cloud-computing environment, such as the one described in patent application Ser. No. 12/417,630 filed 2 Apr. 2009, entitled "System and Method for Processing Telephony Sessions", which is incorporated in its entirety by this reference. The system 10 preferably functions to provide the highest quality path for communication between two endpoints in response to one or both of a selected media type and/or the location/configuration of the endpoints of the communications. As an example, the preferred system 10 can function to minimize network latency between different types of endpoints (mobile, PSTN, browser-based telephony, client mobile devices, client browsers) using different types of media (voice, video, text, screen-sharing, multimedia) and disposed in different regions, countries, or continents. In one preferred embodiment, the system 10 is configured for managing a distributed telephony network, but may alternatively be configured for mobile/browser client communication networks, video communication, screen-sharing communication, synchronous media communication, or any suitable communication network. In operation, the preferred system can perform routing and latency minimization in response to one or more of: the features/capabilities of the endpoints; a media quality measurement (video and audio recording); codec availability/compatibility; media resource availability; and/or any suitable metric. During operation, the communication flow of the system 10 will preferably shift between operating modes—a first mode comprising communication flow between an endpoint of a local region to a remote region with more resources and a second mode comprising communication flow substantially within the local region. Communication flow is preferably a media data stream that is used in the substantially real-time communication of media or multimedia. An exemplary benefit of the system 10 is that complex, stateful, or expensive communication resources may be maintained in limited regions and other resources can be implemented globally or regionally to support particular local regions. The limited communication resources may be complex because they maintain considerable state information of the platform, and replicating the state information regionally/globally would result in increased complexity and cost. The limited communication resources can be central resources that only exist in one designated remote region. But the limited communication resource may alternatively exist a subset of all regional systems. Communication platforms, which may be susceptible to global/regional scaling issues due to the real-time nature of synchronous communication, can use the system to dynamically switch between communicating within a local region and communicating with resources of a remote region.

As shown in FIG. 1, the preferred system 10 is operable in at least two regions 12, 14, which are connectable through and/or serviced by a communication-processing server 16. The preferred system 10 can also include one or more provider services (P1, P2, P3, PN) and one or more gateways (X1, X2, XN) in the first region 12 and one or more communication-processing servers (H1, H2, H3, HN) in the second region 14. The preferred system functions to maintain functional communication when the first region 12 and second region 14 are spatially separated by a globally significant transmission distance. A globally significant distance in this document may be understood to be a transmission distance greater than 2000 miles and more preferably greater than 5000 miles. For example, the first region 12 may be on the West coast of the US and the second region 14 may be on the East coast, separated by a geographic distance greater than 2500 miles. In another example, the first region 12 may be in the United States and the second region may be in Europe, separated by a distance greater than 3500 miles. The first region 12 and the second region 14 are not limited to functioning with such distance ranges and may be separated by a distance less than 2000 miles or exceeding 5000 miles.

The provider services (P1, P2, P3) preferably receive or initiate communication to an endpoint such as a caller, a mobile or browser client. The provider service is preferably an interface between the communication platform of the system 10 and communication providers. Communication providers preferably include telephony carrier networks, client applications using IP based communication protocols, or any suitable outside network. The system 10 may include a plurality of regions in addition to the first and second regions 12, 14. The provider services are preferably specific to each region as they are determined by the communication service providers, networks, and established contracts with various communication entities. Communication to an endpoint may alternatively be initiated from the platform. For example, an API call may specify that at least one endpoint should be contacted.

Incoming communications to a destination endpoint are preferably routed to the provider services in response to the destination endpoint being registered with the system 10. For example, a user dialing a PSTN number belonging to the system 10 will preferably have the communication directed to a provider service (P1, P2, or P3). Another example, a user dialing a SIP based endpoint that specifies a domain registered in DNS to the system 10 will preferably have the communication directed to a provider service (P1, P2, or P3). The provider additionally creates invite requests and responses that are preferably sent to a regional address (e.g., europe.twilio.com) and resolved to a communication gateway. In some variations, communication may be directly connected to a communication gateway to achieve a lower latency audio/video. This may be particularly advantageous to mobile and browser clients. The Domain Name System (DNS), anycast, or any suitable addressing and routing methodology may be used to forward to the closest communication gateway of a particular zone. The provider services preferably use SIP protocol for communication within the system, but the outside connected communication devices may use any suitable communication protocol. The signaling portion of the communication preferably contributes control directives and a mechanism to communicate various aspects concerning a communication session. The media portion of the communication is preferably the channel through which media is transferred. The medium of the communication can preferably include any suitable combination of possible media mediums such as audio, video, screen-sharing, virtual environment data, or other suitable synchronous media mediums. The media portion can be particularly susceptible to latency issues caused by the routing path. The signaling route and the media route can diverge in their network topology.

The communication gateways (X1, X2) are preferably configured for both media and signaling. A communication gateway preferably mediates Session Initiation Protocol (SIP) signaling between at least one endpoint of a communication, from call establishment to termination. SIP is a signaling protocol widely used for controlling communication sessions such as voice and/or video calls over Internet Protocol. Any suitable communication protocol such as RTP or combination of protocols may alternatively be used. As a SIP mediator, the communication gateway preferably creates SIP invites, issues other SIP signaling messages, and facilitates transfer of media (e.g., audio, video) between various end-points. The communication gateways (X1, X2, XN) are preferably logical network elements of a SIP application, and more preferably configured as back-to-back user agents (b2bua) for one or both of media and signaling control. A b2bua, as would be readily understood by a person of ordinary skill in the art, preferably operates between endpoints involved in a communication session (e.g., a phone call, video chat session, or screen-sharing session). The b2bua also divides a communication channel into at least two communication legs and mediates signaling between the involved endpoints from call establishment to termination. As such, the communication gateway can facilitate switching the communication flow from flowing through a remote region (to use remote resources) to flowing just within the local region (e.g., when establishing a call with another endpoint in the local region). The communication gateway may additionally include media processing components/resources such as Dual-tone Multi-frequency (DTMF) detector, media recorder, text-to-speech (TTS), and/or any suitable processor or service. The media processing and signaling components of a communication gateway may alternatively be divided into any suitable number of components or services in cooperative communication. In one variation, the communication gateway is implemented by two distinct components—a signaling gateway that handles the signaling and a media gateway that handles media processing and media communication. In an alternative embodiment, the communication gateways may be configured as a control channel that functions to allow devices to directly communicate peer-to-peer. Browser clients, mobile clients, or any suitable combination of clients may have direct media communication in this variation. This alternative embodiment is preferably used with low-latency media. As an additional security precaution, communication gateways may be configured to allow traffic from only a distinct set of providers. Other providers are preferably firewalled off to protect infrastructure from the public Internet. The communication gateways will preferably respond to communications and/or propagate the communication messages to a communication-processing server. The communication-processing server may be in a different remote region. Load balancers may additionally facilitate a communication propagating from a communication gateway to an optimal communication-processing server. For example, there may be multiple remote regions with available communication-processing servers that can service a communication. A load balancer or alternatively a routing policy engine may direct the communication to an appropriate the region and/or communication-processing server.

The communication-processing servers (H1, H2, H3) function to process communication from a communication gateway. A communication-processing server preferably provides value-added features or services to a communication. A preferred communication-processing server is preferably a call router or telephony application processing component as described in patent application Ser. No. 12/417,630 referenced and incorporated above. A communication-processing server (or more specifically a call router) will preferably retrieve an addressable application resource (e.g., HTTP URI address document) associated with the phone number or communication indicator. In a preferred embodiment, the resource is a telephony application that indicates sequential telephony commands for the communication session of the client(s). The telephony commands may include instructions to call another communication endpoint, to start a conference call, to play audio, to record audio or video, to convert text to speech, to transcribe audio, to perform answering machine detection, to send text or media messages (e.g., SMS or MMS messages), to collect DTMF key entry, to end a call, or perform any suitable action. The telephony instructions are preferably communicated in a telephony instruction markup language such as TwiML. The addressable resource is preferably hosted at the HTTP Server 16. The servers (H1, H2, H3) and HTTP server 16 communications are preferably RESTful in nature in both/all directions. RESTful is understood in this document to describe a Representational State Transfer architecture as is known in the art. The RESTful HTTP requests are preferably stateless, thus each message communicated from any component in the system 10 preferably contains all necessary information for operation and/or performance of the specified function. Signaling will preferably be transferred through the server, but media may not be transferred through the server.

The communication-processing server is preferably part of a telephony application platform and may cooperatively use several other resources in operation. The communication-processing server may be a central component to the service provided by a platform and as such may be associated with considerable stateful data generated in use of the server. The stateful data may be used in internal logic and operation of the platform and/or for providing API accessible data and information. The system 10 is preferably implemented in a multi-tenant environment where multiple accounts share/operate with the same resources. As such, there may be benefits in keeping the communication-processing servers centrally located in a limited number of regions. Since the communication-processing server may not be located in each local region, a local region may call out, bridge or otherwise communicate with a remote region that does hold a communication-processing server. As mentioned above, the communication-processing server may provide any suitable processing services in addition to or as an alternative to the call router variation described above.

As shown in FIG. 1, the preferred system 10 can route communication traffic between User 1 and User 2, wherein the communications traffic can include any suitable media type, device endpoint type, and/or network type usable in a suitable cloud-based communications system of the type described above. In an example of the preferred system's 10 operation, when User 1 wants to communicate with User 2 (a PTSN number that is part of the cloud-based system), his call is routed to provider P2. As described below, the number dialed is preferably associated with a URL or other identifier usable in the aforementioned cloud-communications system. Preferably, provider P2 creates a corresponding invite request in block 100 and sends it to a predefined server address (e.g., europe.twilio.com, us_1.twilio.com, us_2.twilio.com, etc.), which in turn resolves to communication gateway X1. Upon receipt, the communication gateway X1 preferably transmits or forwards the request to communication-processing server H3 in block S102, which as shown can be located in the second region 14. The server H3 functions to query the HTTP server 16 associated with the URL of the dialed number in block S104 to determine, receive, download, and/or capture any instructions, commands, or content associated with the dialed number. The HTTP server 16 is preferably an outside server managed by a developer or administrating entity. In a simple example, the server H3 contacts the HTTP server 16 and receives a single command (i.e., a "dial" verb) associated with the number. Other suitable commands (i.e., instruction primitives), each of which can be referred to as a TwiML verb in the example embodiment, can include saying text to the caller, sending an SMS message, playing an audio and/or video file, getting input from the keypad, recording audio or video, connecting the call to another phone, or any other suitable type or media of communication. Executing the commands can depend on various media services, which require selecting media resources of the local or a remote region to fulfill the command, and directing media flow through media resources. In some instances that media flow can result in media services being completely fulfilled independent of resources in a remote region. Similarly, the media may be routed between two different local regions independent of resources in a central remote region. In other instances, the media flow is fully rerouted through at least one remote region. In yet another instance, an ancillary media channel can be established between the local and remote region to support consistent platform state.

As shown in FIG. 1, in block S106 the HTTP server 16 returns the TwiML to server H3, at which point the server H3 processes the TwiML to determine the particulars of the initial request, i.e., to whom the call is directed, where the other endpoint is located, what type of media is being directed to the second user, and the like. In the example embodiment shown in FIG. 1, the second user is located in the first region 12 with the first user, and therefore the server H3 returns the invite request back to communication gateway X1 for further processing in block S108. Upon receipt, the communication gateway X1: determines that the inbound request is related to the prior invite request received in block S100; and transmits the request to a predetermined provider P3 in block S110 for eventual connection of the communication to the second user from P3. Preferably, upon connection between provider P3 and the second user, the communication traffic between the first and second users will flow directly between the providers P2 and P3 in block S112 with little to no input from any other component of the preferred system 10 in the second region 14. In one variation of the preferred system 10, media files and/or functionality are stored at and/or performed by one or more of the communication gateways X1 working alone or in combination with each other or additional servers, databases, and/or controllers. As will be described in further detail below, the communication traffic may be subsequently dynamically redirected to route through the server H3. For example, one of the endpoints may hang up, and the remaining endpoint may have communication traffic flow from the endpoint of P1 to X1 to H3 and back during the execution of other communication instructions.

Figure 2:
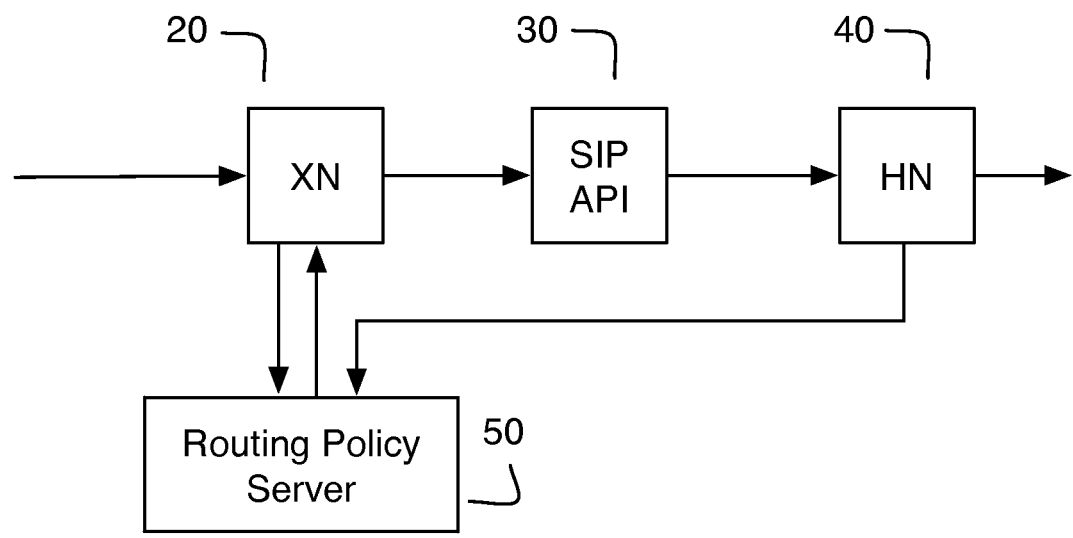
FIG. 2 is a schematic block diagram of a variation of the preferred system and method for managing latency in a telephony network.

As shown in FIG. 2, one variation of the preferred system 10 can additionally include a routing policy server 50 in communication with the communication gateway XN 20 and/or a communication-processing server H3, and further include a SIP API 30 in communication with both the communication gateway 20 and server HN 40. In one example configuration of the preferred system 10, the communication gateway 20 functions in part as a back-to-back user agent (b2bua) for one or both of media and signaling control. As an example, the communication gateway 20 can be configured to handle multiple types of re-invite scenarios and to transfer audio, video, or other media between various communicating endpoints. Preferably, the communication gateway 20 can be configured to record audio or video streams and/or play any suitable type of media file (e.g., addressed to a URL). In other configurations of the preferred system 10, the communication gateway 20 can be configured as a real-time transport protocol (RTP) hub for handling RTP communications, RTP events, and/or generating/consuming RTPC sender and receiver reports. As described below, the RTPC reports can be transmitted and/or made available to the policy server 50 such that the policy server 50 has real-time or near real-time information about the quality of different traffic routes in the larger system 10. The quality reports and the routing policy server 50 can additionally work in cooperation with a best quality routing (BQR) routing approach. In another variation of the preferred system 10, the communication gateway 20 can be configured as a single component/unit that handles both media and signaling processes. Alternatively, the communication gateway 20 can be configured as two distinct components (media and signaling) residing on one or more nodes in the larger system 10 environment or in any other suitable configuration or deployment in a distributed network.

As shown in FIG. 2, the present variation of the preferred system 10 can include a routing policy server 50 in communication with the communication-processing server and/or the communication gateway 20. The routing policy server 50 preferably functions to optimize the flow of traffic throughout the preferred system 10 by selecting and/or aiding in selecting the best available communication gateway 20 (X1, X2, XN) and/or communication-processing server (H1, H2) for routing the network traffic. Preferably, the routing policy server 50 optimizes traffic flow in response to one or both of the types/number/location of the endpoints (browser, VOIP, PSTN, mobile/cellular) and the type of media (voice, video, text, multimedia) used in each communication. As shown in FIG. 2, the routing policy server 50 preferably receives input/s from each of the communication gateways 20, for example in the form of RTCP sender and receiver reports, which enables the routing policy server 50 to determine in real time or near real time the current status of each of the communication gateways 20, and in turn to select the optimal communication gateway 20 for any present network session. Preferably, one or both of the communication gateway 20 and/or the server 40 can query the routing policy server 50 for the optimal route, which can be determined in response to one or more inputs received/requested from the communication gateway 20. Additionally or alternatively, the routing policy server 50 can receive from each communication gateway 20 a live quality of service report from which the policy server 50 can determine the current optimal route for any pending sessions. In another variation of the preferred system 10, the routing policy server 50 can apply a universal or generic routing protocol between nodes without consideration of the type of media being enjoyed in the communication session. In use, the preferred policy server 50 can function to prevent overloading of any particular node, server, or route in the preferred system 10 by continuously and substantially simultaneously selecting and/or aiding in the selection of the optimally configured communication gateway 20 and/or server 50 for each pending session.

As shown in FIG. 2, the present variation of the preferred system 10 can further include one or more application programming interfaces (APIs) functioning and/or exposed by one or more components in the preferred system 10. For example, a session initiation protocol (SIP) API 30 is shown in FIG. 2 for coordinating messages/communications between the communication gateway 20 and the server 40. Additionally or alternatively, the routing policy server 50 can include one or more APIs for determining the optimal route between two endpoints in the pending communication. A preferred routing policy server 50 API can be a RESTFul or any suitable alternative type of API. As noted above, in one alternative configuration the communication gateway 20 can include a media portion and a signaling portion, in which case the media portion (not shown) can include an API (such as a REST or Java API) to respond to media allocation requests from the signaling portion (not shown) of the communication gateway 20. In operation, a suitable communication gateway 20 API can expose one or more functionalities (i.e., allocation of a media resource with the following capabilities) and then return a resource identifier, IP address, and/or port to where the media should be directed.

The SIP API 30 can include one or more additional headers and/or configurations for use in the preferred system 10, including a regional header, an action header, a features header, a support header, and/or a required header. In this example implementation, the regional header can indicate a zone from which the request is originating, including for example a regional or sub-regional zone of Europe, Asia, North America, and/or South America. The example action header can include instructions for the receiver to perform one or more designated actions, such as a "hang up" action. The example features header can include one or more system 10 specific features, such as an instruction to hang up if the user presses the star key on his or her terminal, whether the hardware supports call recording, and the like. The example support/required headers can include information that identify any features, protocols, functions, and/or other features that are desirable, optional, or necessary for properly routing the session through any particular set of communication gateways 20 and servers 40.

The system preferably can be configured to perform one or more of the foregoing functions in a computer-readable medium storing computer-readable instructions. The instructions are preferably executed by computer-executable components preferably integrated with the one or more communication gateways (X1, X2, XN) in the first region 12, the one or more communication-processing servers (H1, H2, H3, HN) in the second region 14, the HTTP server 16, the SIP API 30, and/or the routing policy server 50. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but the instructions can alternatively or additionally be executed by any suitable dedicated hardware device.

Preferred Method

Figure 3:
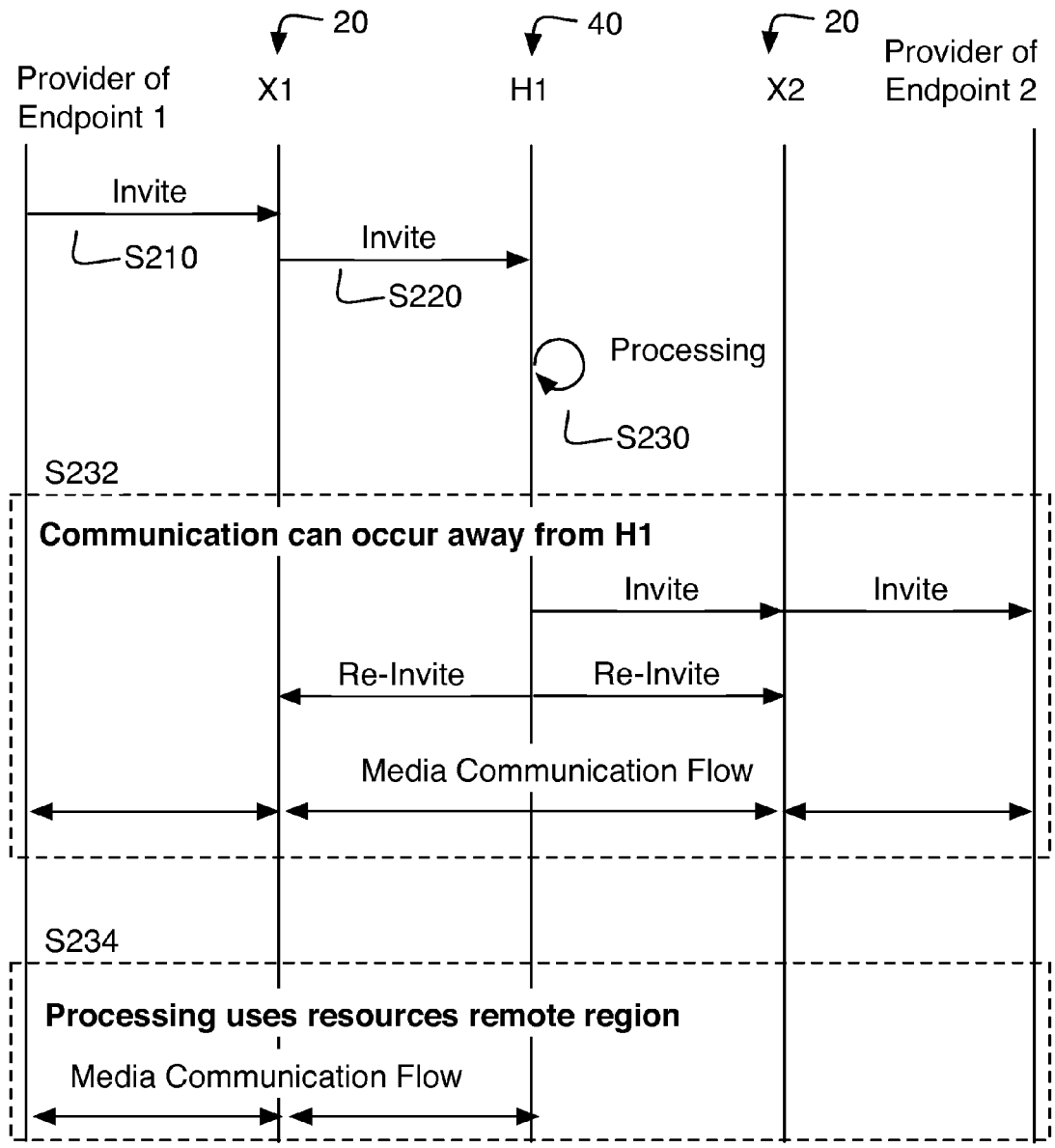
FIG. 3 is a communication flow diagram of an example implementation of the preferred method for managing latency in a telephony network.
Figure 4A:
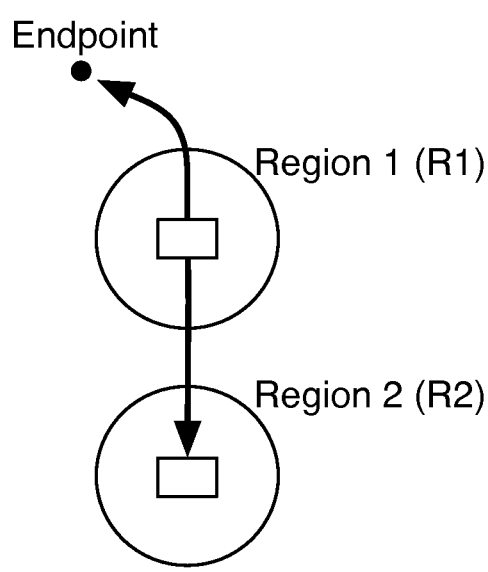
FIGS. 4A-4D are exemplary schematic representations of communication flow between a first and second region.
Figure 4B:
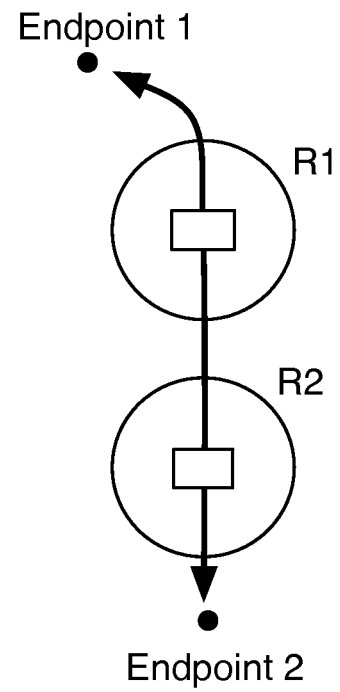
Figure 4C:
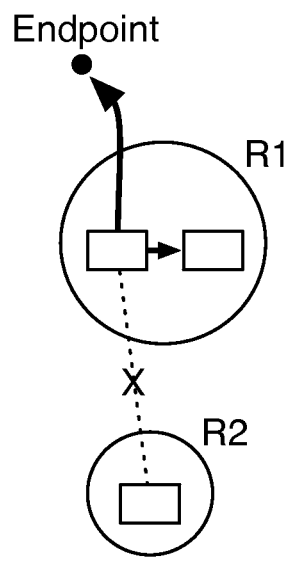
Figure 4D:
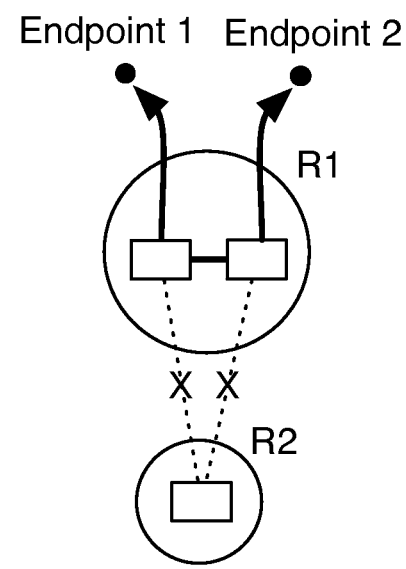

As shown in FIG. 3, a method of the preferred embodiment can include receiving a communication invitation of a first endpoint from a communication provider S210, signaling the communication invitation to a communication-processing server in a second region S220, dynamically directing signaling and media of the communication according to communication processing instructions and the resources available in at least the first and second regions S230 that includes selectively routing media communication exclusively through communication resources of the first region if media resources to execute the processing instructions are available in the first region S232 and selectively routing media communication through at least the communication-processing server if media resources are not in the first region S234. The system functions to dynamically redirect traffic for signaling and media. The method is preferably employed in a regionally/globally distributed communication platform that works with communication susceptible to latency performance issues. The method is preferably used within a communication processing platform such as the telephony platform incorporated by reference above. The method may additionally or alternatively be used with video communication, client based audio communication (e.g., VoIP), screen-sharing applications, and/or any suitable communication platform. Replicating all components in different regions can be expensive and increase complexity of a system. The method enables components to be intelligently and progressively rolled out to new regions (or be statically implemented) without fully replicating the system needed to support the features of a platform—some components may be available in one region and some in others. Preferably, a geographically distributed communication computing platform will include a subset of resources in a first region and a subset of resources in a second region. The subsets of resources are preferably not identical sets (in terms of the function of the components). A local region (used to service particular geographic regions) is preferably a limited sub-set of a remote region (used to provide core platform functionality). Preferably lightweight and ancillary services and components (e.g., signaling and standalone media processing services) are deployed in various regions to support local communication endpoints, and more core or complex resources (e.g., ones that maintain state within the platform) are deployed in a limited number of regions, which are often remotely located from the local regions. The method is preferably used to implement communication instruction processing with a communication stream between the first and second region as shown in FIGS. 4A and 4B, and when a media communication stream can flow exclusively through the first region, dynamically establishing the communication flow to not flow through intermediary media resources of the second region, but instead to use media resources of the first region as shown in FIGS. 4C and 4D.

Block S210, which includes receiving a communication invitation of a first endpoint from a communication provider, functions to initiate a communication session. Preferably a "call" will be directed to the system through a provider service of the first region. The called destination is preferably registered with the system. For example, the telephony endpoint (the phone number, phone number prefix, SIP address, the domain of the SIP address, and the like) is used to route communication to the system in any suitable manner. The provider services preferably ports or provides a network access interface through which outside communication networks connect to the system (and/or conversely, how the system connects to the outside communication networks). A communication will preferably include a call from an endpoint being directed through outside networking to a provider service interface. The provider service will preferably use SIP signaling or any suitable protocol to direct a communication stream to a communication gateway of the first region. A SIP communication invite is preferably received at the communication gateway or more specifically a SIP signaling gateway acting as a b2bua. Herein, "calls" may refer to PSTN phone calls, IP based video calls, screen-sharing sessions, multimedia sessions, and/or any suitable synchronous media communication. Calls can additionally be mixed medium/protocols. For example, a call (i.e., communication session) may have one leg connect to a PSTN telephony device while a second leg connects to a SIP based client application. Calls may alternatively be initiated from within the system such as in response to an API request or any suitable event.

The communication session preferably includes a signaling and media communication to an endpoint through a provider service connector in the region of the endpoint (i.e., a local region). In one variation, only one endpoint may include in the communication session, such as where the platform provides media interactions with the endpoint. In another variation, the endpoint communication with one or more endpoints. The other endpoint(s) can be in the same local region, a central remote region, and/or a remote region that serves a local area. Block S210 preferably includes establishing a media communication to at least one endpoint and a signaling communication. As described below, the communication session will preferably additionally include establishing, at least at one point, a signaling communication to the remote region where control logic can facilitate directing the media communication.

Figure 7:
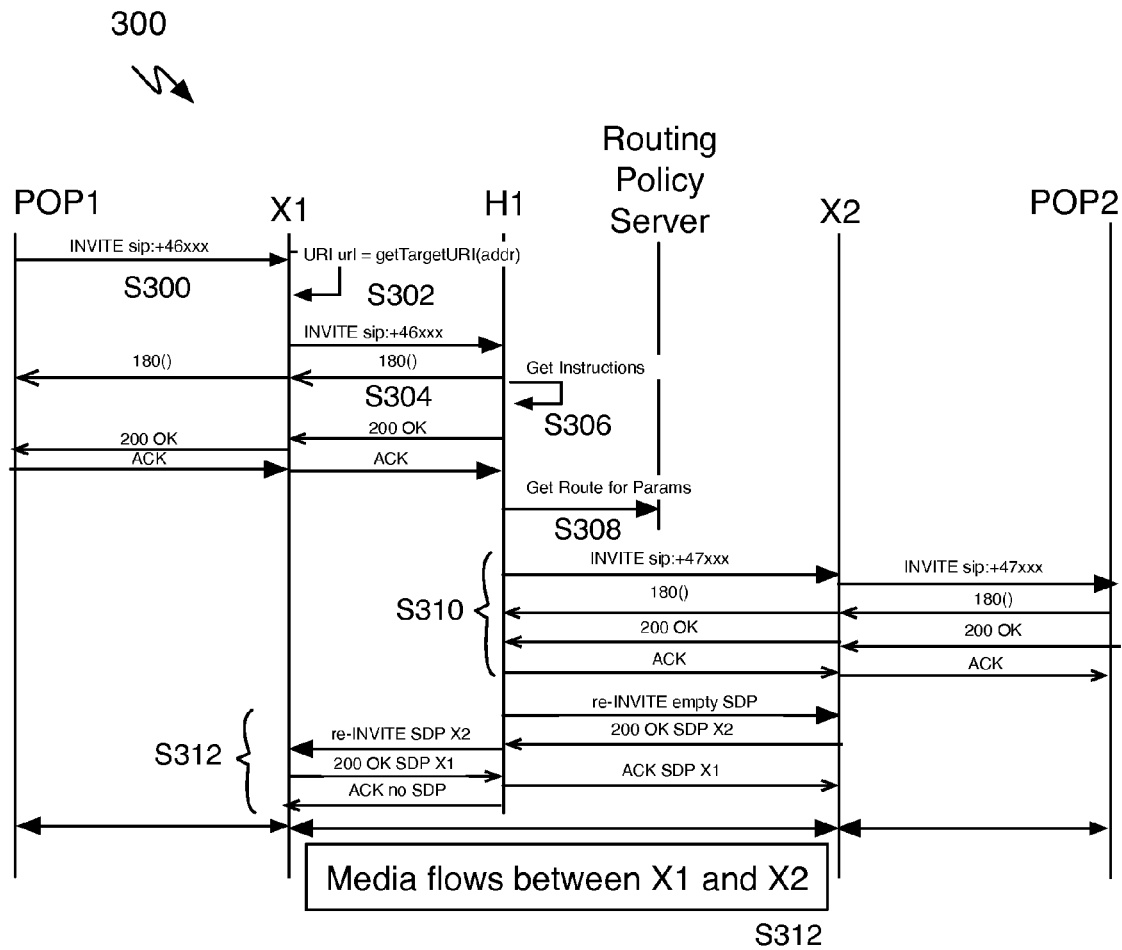
FIG. 7 is an exemplary communication flow diagram of an implementation for a call between two PSTN devices of the method of the preferred embodiment.

Block S220, which includes signaling the communication invitation to a communication-processing server in a second region, functions to direct the communication to a communication-processing server in another region. The other region (the second region) is preferably spatially separate and remotely located from the first region. The distance of separation is preferably a globally significant distance. Within the US, the distance may be greater than 2000 miles (across country). Across the globe, the distance may be greater than 5000 miles. The communication gateway preferably directs the communication signaling. As shown in FIG. 7, the communication invitation is preferably a SIP invite but may alternatively be a communication invitation of any suitable protocol. The communication gateway may additionally query a routing policy engine prior to transmitting the communication invitation. The routing policy server will preferably determine an appropriate routing of the call. Preferably the routing policy server will identify the appropriate communication-processing server in the second region. Additionally, the routing policy server may consider communication-processing servers in a plurality of regions (possibly including the first region). In another variation, the routing policy server may detect that the resources for processing the particular call can be handled within the first region and direct that call appropriately within the first region. For example, a particular phone number may not be configured for telephony application processing and simply redirect to another endpoint accessible through the first region. In this example, the communication gateway may forego accessing a call router in a second region, and establish media communication flow between the first and second endpoint using resources of the first region.

The communication-processing server can provide any suitable communication processing service. The communication-processing server and/or any suitable component can trigger modification of the media communication wherein at least one media resource in the media communication route is changed. The change preferably includes adding a media resource, but the change may additionally or alternatively include removing a media resource. Preferably, the communication-processing server acts as a call router that manages execution of a communication session application. Processing a communication application can include operations such as connecting to endpoints, recording media, processing media (converting text-to-speech, transcribing audio to text, transcoding between media codecs), retrieving device inputs (e.g., DTMF capture), sending messages or emails, ending calls, providing answering machine detection, or providing any suitable service. In one preferred variation, the method may additionally include, within the second region, a communication-processing server retrieving application instructions from an internet accessible server at a URI that is associated with a destination endpoint of the communication invitation. In this variation, the communication-processing server is preferably a call router as described in the incorporated patent application Ser. No. 12/417,630. The application instructions are preferably formatted as markup instructions within a document retrieved over HTTP using a web request-response model.

Block S230, which includes dynamically directing signaling and media of the communication according to communication processing instructions and the resources available in at least the first and second regions functions to redirect communication to appropriate regions. The directing of signaling and media is preferably dynamically responsive to the active state of the communication. Preferably, the signal and media direction is responsive to application state of a communication. Application state may include streaming media between two outside endpoints, playing media from the system to an endpoint, processing or recording media of a communication, or any suitable application state. The communication routing is preferably changed to increase the communication performance of the current state of a communication. For example, if a first endpoint is connected to a second endpoint, and the first and second endpoints are in the same region, the communication media stream is preferably kept within the first region. This can preferably reduce the amount of communication latency that might be involved in routing through a second region. In a contrasting situation, if the communication of a first endpoint necessitates particular media processing not available in the first region, a communication flow may be established with a second region. Additionally, an application can be configured with any suitable logic. For example, a call may be responsive to a new connection to an endpoint, to one of two endpoints hanging up, to initiating media processing (e.g., audio recording, transcription, or DTMF detection), or to sending an out of stream communication (e.g., SMS or MMS) and the like. The media and the signaling channels may be routed independently according to particular requirements. Depending on the state of the communication and the media services acting on the communication, various components may be maintained in the signaling channel. For example, the communication-processing server may be maintained in the signaling route while the media route does not pass through the remote region, which can enable the communication-processing server to respond to events and redirect media as required.

Dynamically directing the signaling and media of the communication can include selecting the media, which functions to determine the network path. Generally, the selected media path includes the media resources required to fulfill the functionality requirements. The determination and selection of the media can additionally be made according to the communication quality impact of routing through that media resource. Communication quality can depend on latency, but other factors such as resource capacity, resource operational cost, and other suitable factors may be considered. In many cases, media resources closer in geographical and/or in network topology are preferred over media resources more remote. Accordingly, if a media resource is available in a region local to the endpoint(s) involved in the communication, then that media resource is selected. If a media resource is not available, then the media resource used is outside of the local region. In one variation, a core media resource in a core remote region may be used. In another variation, a second local region (serving a different area) may be used.

Block S232, which includes selectively routing media communication exclusively through communication resources of the first region if media resources to execute the processing instructions are available in the first region, functions to route communication within a region. The resources of the region are preferably sufficient to support the current state of the communication session. In a preferred variation, the media communication is exclusively routed through the communication resources of the first region for calls to other endpoints in the region. In one variation, a media resource in the platform actively manipulates the media communication. In this variation, a single endpoint may connect such as when an endpoint has a text-to-speech media server or a media player plays audio for the connected endpoint. In another variation, the media resource is an ancillary media resource that transparently monitors and operates on the media. In both variations, multiple endpoints may be part of the communication session In the variation with multiple endpoints, Block S232 preferably includes a communication-processing server inviting a second gateway, the second communication gateway inviting a second endpoint accessible through a provider service of the first region, and the communication-processing server re-inviting the first and second communication gateways to establish media communication flow between the first and second endpoints. The communication is also directed away from the communication-processing server of the second region. As a slight variation, the media communication flow may even be established to flow directly between the first and second endpoints without passing through a gateway of the first region. The first and second endpoints can be PSTN-based endpoints, SIP based endpoints, RTP based endpoints, endpoints accessible through a proprietary IP protocol (e.g., $3^{rd}$ party communication app), or any suitable endpoint. An endpoint is preferably any addressable communication destination, which may be a phone, a client application (e.g., desktop or mobile application), an IP based device or any suitable communication device. The endpoints can use any suitable protocol and the first and second endpoints may additionally use different communication protocols or mediums.

Additionally or alternatively, routing media communication exclusively through communication resources of the first region may include selecting a media resource of the first region to facilitate the media communication flow. In some cases, select media resources may be deployed/implemented in the first region. When the current communication media stream transitions to a state where it requires only the media resources of the first region, the media communication flow will preferably utilize the media resources of the first region, rather than those of the remotely located resources in the second region. For example, an application may initiate a media recording instruction. If a recording resource is in the first region, the communication gateway may direct communication flow to go to the local recording server as opposed to a recording server in a different region. In another example, a media transcoding server may be accessed to transcode media for two endpoints. Two endpoints may use different media codecs that are not compatible. The transcoding service will preferably be added as an intermediary in the communication flow so that the media can be transcoded with low latency.

The method may include querying a routing policy service for a selected communication route, which functions to dynamically select a communication route. The routing policy server can use the current state of the system, individual regions, individual resources/services/components of a region, application state, or any suitable parameter as an input. In one variation, the routing policy service is substantially statically defined. A set of rules and/or architecture configuration may be used to select the routes. In another variation, the routing policy service performs an analysis and selects a route that has statistical indications to be an optimal route based on the analysis. In the case of rerouting to augment the included media resources, the routing policy service preferably selects a route according to functionality requirements and the availability. The functionality condition preferably determines what media resource or resources are capable and required for the communication session (e.g., recording media, text to speech, transcoding, etc.). Availability preferably evaluates what regions have the media resources, the quality of service they can provide, and what is the capacity/availability of those media resources. The routing policy server is preferably queried by the communication-processing server to select communication gateways. The routing policy server may additionally or alternatively be used by the communication gateway to select a communication-processing server in block S220. There may be one canonical routing policy server or multiple routing policy server instances may be established in multiple regions.

Block S234, which includes selectively routing media communication through at least the communication-processing server if media resources are not in the first region, functions to route communication between the first and second regions. This selective option is preferably taken when the resource needed or preferred for handling the communication session is not within the local region (i.e., the first region). As with the initiation of a call, the communication gateway preferably initially connects to a communication-processing server. As was mentioned above, this default behavior may not be taken if the next state of the communication is known without accessing the communication-processing server. Additional resources within the second region may additionally or alternatively be used with the communication-processing server. For example, media resources such as recording service, text-to-speech servers, transcoding servers, transcription/speech recognition servers, and/or any suitable media resource may be implemented in the second region and may act on the media communication flow.

Figure 5:
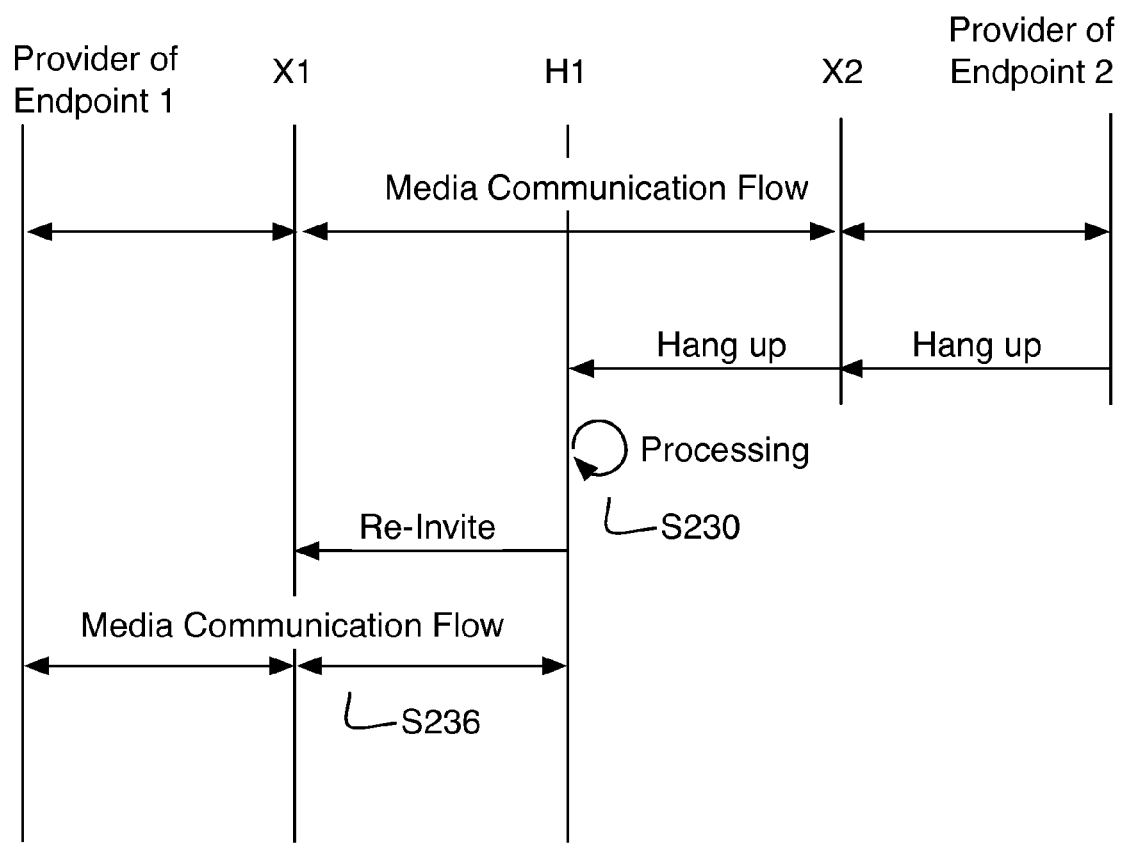
FIG. 5 is a communication flow diagram of a variation re-establishing communication of the preferred embodiment.

As mentioned above, the directing of the communication can dynamically change. The method may additionally include re-establishing communication with the communication-processing server upon a second endpoint terminating the media communication flow S236 as shown in FIG. 5. Block S236 can function to enable the communication to recover after communication flow has moved away from a resource of the second region. As mentioned, the second region preferably includes a communication-processing server that can be configured for processing application state of a communication session. Since the communication-processing server may not be in the communication flow when two endpoints are connected, a communication gateway in the first region will preferably re-invite a communication-processing server and reestablish communication flow between the first endpoint and the communication-processing server. For example, two callers may be talking in a first region. When the callee hangs up, the first caller may be connected to a call router in a second region that can play text to speech audio or perform any suitable application action. The communication flow can be redirected any number of times.

Figure 6:
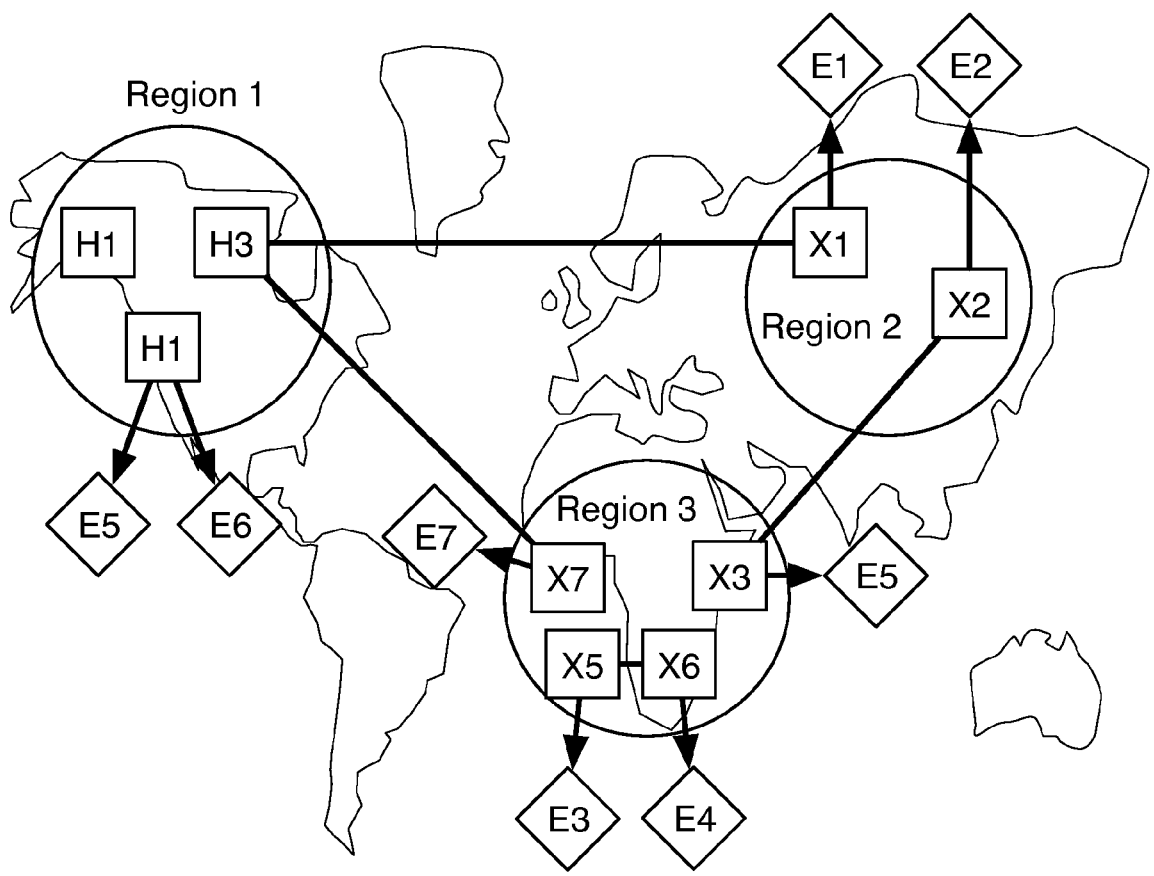
FIG. 6 is an exemplary representation of the system and method of the preferred embodiment implemented within various regions.

As shown in FIG. 6, the method may additionally be expanded such that communication flow may be directed between any suitable number of regions. In an exemplary implementation, there may be at least two base regions in the US, with globally diversified local regions such as one in Europe, one in Asia, and one in South America. These regions may dynamically route communication based on an optimal or preferred route. The preferred route may be based on substantially static configuration of the different regions (e.g., how many resources are in each region), but may alternatively be based on quality metrics such as latency, quality of service reports, or any suitable metrics.

Example Implementations

As shown in FIG. 7, one example implementation of the system and/or method of the preferred embodiment can include a telephone call between a pair of PSTN telephone users. Those of skill in the art will readily appreciate that the following description is of an exemplary setting of the system and/or method of the preferred embodiment and does not limit the claimed invention to any particular aspect or feature described below. As shown in method 300 in FIG. 7, block S300 can include receiving a call invitation at a first communication gateway X1 from a first user's POP (point of presence provider or in other words a provider server). As noted above, FIG. 7 illustrates a single use case in which the desired communication is between two PSTN users. Accordingly, the content of block S300 can include an invitation for a voice call identifying both the media (voice) as well as the desired endpoint (phone number to which the call is directed).

In block S302, the first communication gateway preferably performs any necessary authentications, security checks, verifications, and/or credential checks for one or both of the caller and the recipient. Block S302 can additionally include looking up and/or identifying a target uniform resource identifier (URI) for the invitation, which designates the next destination for the transmission, i.e., the suitable regional communication-processing server H1 for the request. As shown in FIG. 7, upon receipt of the request at the server H1, the server H1 responds to the communication gateway X1, which in turn propagates the response back to the POP (point of presence) service (e.g., the provider service) in block S304.

In block S306, the server H1 downloads and/or retrieves the TwiML based on the URI associated with the dialed number (which corresponds to an address in one variation of the preferred system and method). Preferably, block S306 can further include determining if there is any media associated with the session. Preferably, the existence or requirement of a particular media can be determined with reference to the TwiML, which can contain predefined actions or verbs. Suitable actions or verbs can include dialing a number, saying text to the caller, sending an SMS message, playing an audio or video file, getting input from the keypad, recording audio or video, connecting the call to another browser client or device, or any other suitable type or media of communication. In the example implementation, the TwiML would contain the "dial" verb, which requires media. Following a series of mutual acknowledgements, the transmission of media is opened up between the POP and the server H1 in block S306.

As shown in FIG. 7, the example implementation can include block S308, which includes determining an optimal route for the media at the routing policy server. Preferably, block S308 is performed substantially simultaneously with the series of acknowledgements performed in block S306. Preferably, the policy server 50 optimizes traffic flow in response to one or both of the types/number/location of the endpoints (browser, VOIP, PSTN, mobile/cellular) and the type of media (voice, video, text, multimedia) used in each communication. As noted above, the routing policy server preferably receives input/s from one or both of the communication gateways X1 or X2, for example in the form of RTCP sender and receiver reports, which enables the routing policy server to determine in real time or near real time the current status of each of the communication gateways X1 and X2, and in turn to select an optimal communication gateway X2 for the proposed call. Here optimal is used to indicate an algorithmically probable best route. As shown in FIG. 3, the server H1 requests the optimal route from the policy server in block S308. Additionally or alternatively, the routing policy server can receive from each communication gateway XN a live quality of service report from which the policy server can determine the current optimal route for any pending sessions.

As shown in FIG. 7, once the policy server determines the optimal route (i.e., a second communication gateway X2), it will return the appropriate URI to the server H1 so that the server H1 can communicate directly with the second communication gateway X2. In block S310, the example implementation can include a series of requests, invites, and acknowledgements between the server H1, the second communication gateway X2, and the second POP destination of the call recipient. Upon establishing the second leg of the communication session, block S312 can include checking the two endpoints (via first and second communication gateways X1 and X2), and then permitting media to flow between the first and second communication gateways X1 and X2 in block S314.

Preferably, the server H1 is not involved in the media flow of block S314. Accordingly, another example implementation can include detecting, at each of the first and second communication gateways X1 and X2, whether each respective side of the session has timed out for some reason. In response to a timeout at the first communication gateway X1, the first communication gateway X1 will alert the server H1, which in turn will hang up both the caller side and the callee side of the session. Alternatively, if it is the second communication gateway X2 that times out, then the server H1 can be configured to only terminate or hang up on the callee side in the event that there are more actions or verbs to execute on the caller side.

The foregoing example implementation illustrates one aspect of the preferred system and method using a single dial verb between two PSTN users in a telephony system. However, the preferred system and method can be readily configured for any suitable combination of verbs, user types, and media types found in a cloud-based communication network system. Some example alternative implementations can include usage of the say verb, the hang up verb, the gather verb, either alone or in combination with the dial verb described above.

Figure 8:
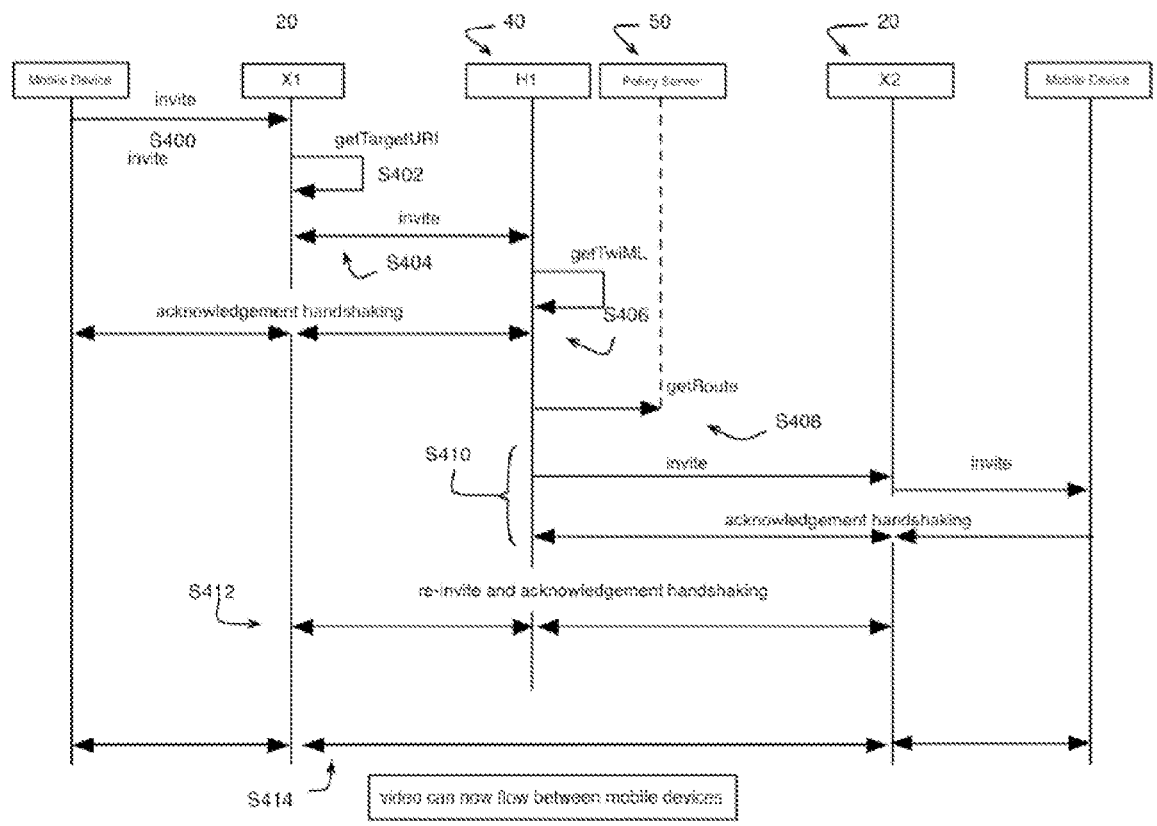
FIG. 8 is an exemplary communication flow diagram of an implementation for a call between two client devices of the method of the preferred embodiment.

As shown in FIG. 8, a second exemplary implementation of the system and/or method of the preferred embodiment can include video streaming between two mobile devices. In this example, client mobile or browser devices may connect directly to communication gateways X1 and X2. This variation functions in a substantially similar manner to the above example but may vary in communication medium/protocols and user devices. In this variation, block S400 may include receiving a video invitation at a first communication gateway X1 from a mobile device. Alternatively, a video invitation may be received at a first communication gateway X1 from a POP. Blocks S402, S404, S406, S408, S410, and S412 are substantially similar to steps S302, S304, S306, S308, S310, and S312 except in implementation differences accommodating for video streaming and direct connection of the mobile devices to the communication gateways. These blocks preferably establish two legs of a communication session such that video can flow between the first and second mobile device in block S414.

Figure 9:
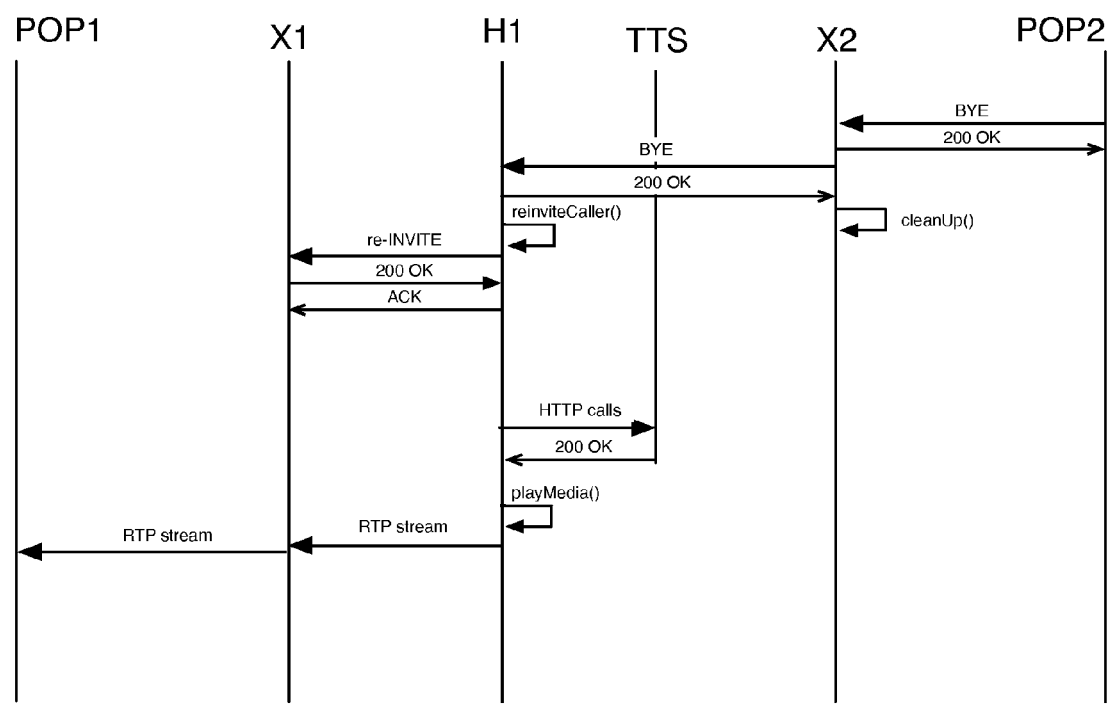
FIG. 9 is an exemplary communication flow diagram of a telephony application with dial followed by a text-to-speech instruction.

As shown in FIG. 9, a third exemplary implementation of the system and/or method of the preferred embodiment can accommodate a dial followed by a text-to-speech command. This is preferably an extension of method 300 above, where a user handing up re-invites between the communication-processing server and the communication gateway can occur multiple times throughout the lifetime of a call. A communication will preferably be initialized as described above so that media communication flows between two endpoints of a first region. One of the endpoints hangs up causing a SIP BYE signal to be sent to a second communication gateway (X2). X2 then propagates the BYE to the communication-processing server (H1) in the second region. The H1 in this scenario will evaluate the application instructions. If more instructions exist within the application, then the H1 can re-invite the first endpoint to bring media communication flow back to the H1 The H1 re-invites the first communication gateway (X1), a 200 OK reply is received, an acknowledgement signal is delivered, and media communication will once again flow between X1 and H1. In this variation, the next communication instruction is to play text-to-speech audio. The H1 will preferably call out to a TTS service to download or access the audio, and then the H1 will stream the media to the X1 and the X1 will stream the media to the first endpoint. In an alternative version, the H1 may instruct the X1 to perform the TTS operations or to use a TTS service of the first region.

Figure 10:
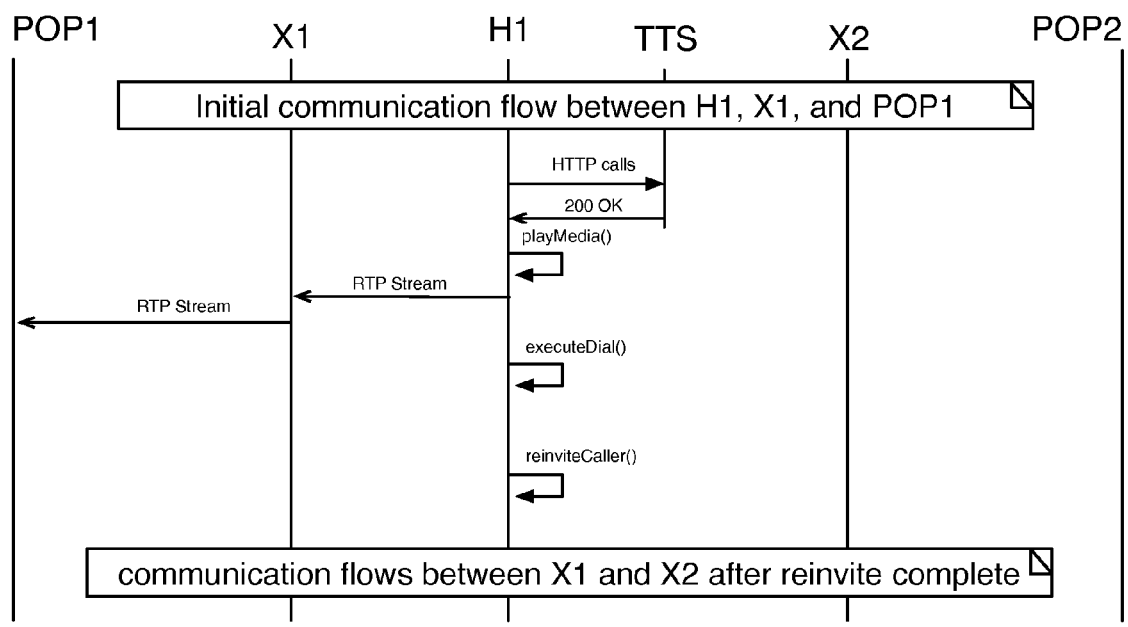
FIG. 10 is an exemplary communication flow diagram of a telephony application with a say instruction followed by a dial instruction.

As shown in FIG. 10, a fourth exemplary implementation of the system and/or method of the preferred embodiment can accommodate a say followed by a dial. A caller form a first region dials in and is invited to a H1 via a communication gateway X1 as in the initial portion of method 300. Once the call has been established, the H1 preferably downloads or accesses the communication platform with the communication instructions. In this particular example, the instructions include a say instruction followed by a dial instruction. The H1 will contact a TTS server and play the media. After the media of the TTS has completed, the H1 will preferably continue to execute the communication instructions and will thus execute the dial instruction. If the dial instruction is to an endpoint in the first region, the second endpoint will be added to the communication flow in a manner similar to that in 300.

Figure 11:
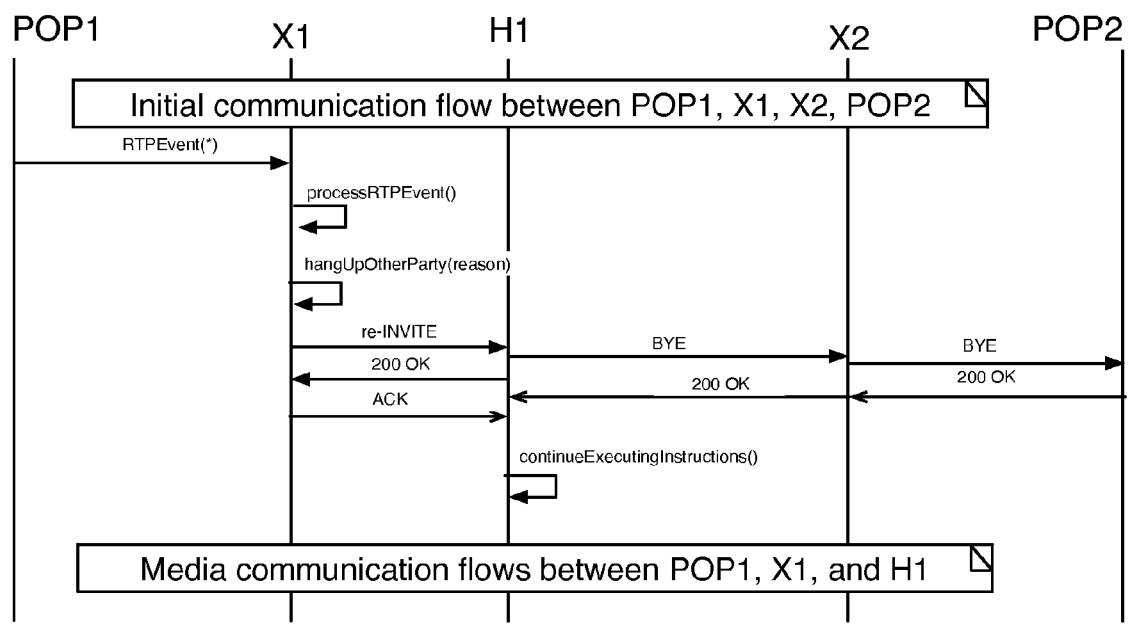
FIGS. 11 and 12 is an exemplary communication flow diagram of a telephony application hanging up a call based on detected input.
Figure 12:
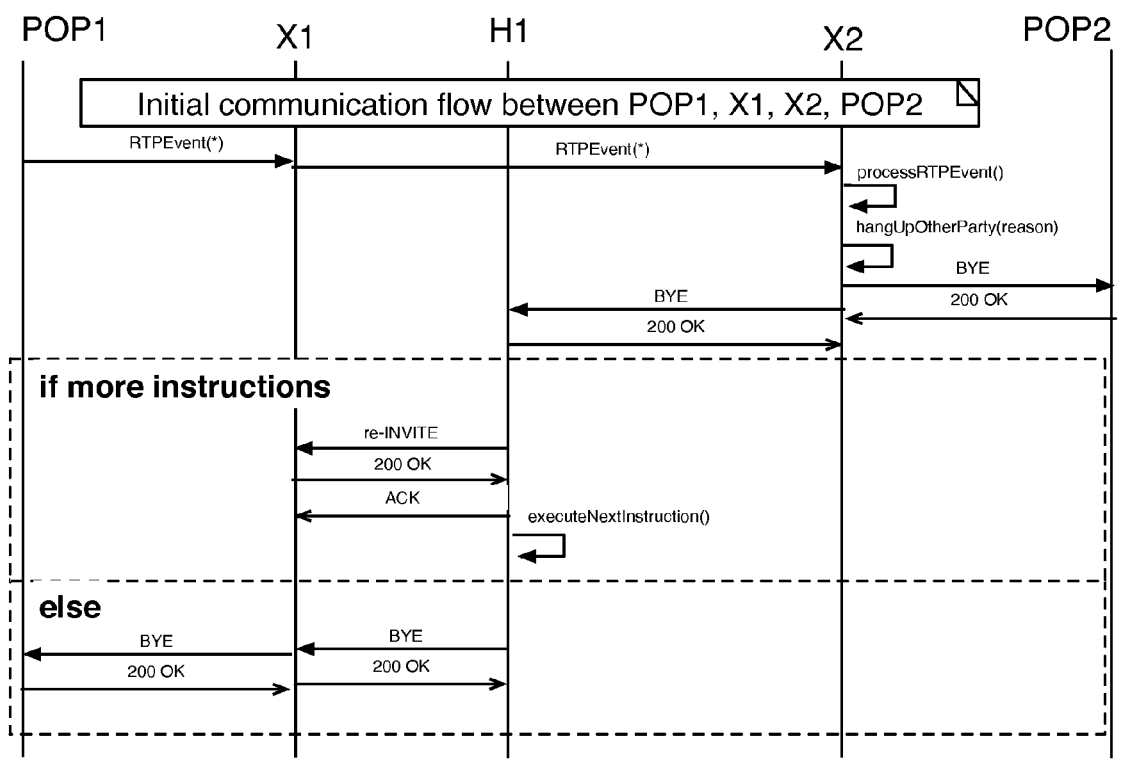

As shown in FIG. 11, a fifth exemplary implementation of the system and/or method of the preferred embodiment can accommodate hanging up a call on a detected input. In this example, the detected input will be the DTMF input of a star (*). A user presses star when they are ready to end a call. An RTP event is sent to the provider service, which is then delivered to X1. X1 will initiate a hang up of the other party. To hang up, a re-invite signal is sent to the H1 with an action header that asks the communication processing service to hang up the other side. The H1 then issues a BYE sequence to the second endpoint through the X2 and continues executing any remaining application instructions. In an alternative implementation shown in FIG. 12, X1 delivers the RTP event to X2, which initiates the hang up process. X2 signals the end of the call and ends communication with the H1. H1 will then re-invite X1 or hang up depending on the state of the communication platform.

Figure 13:
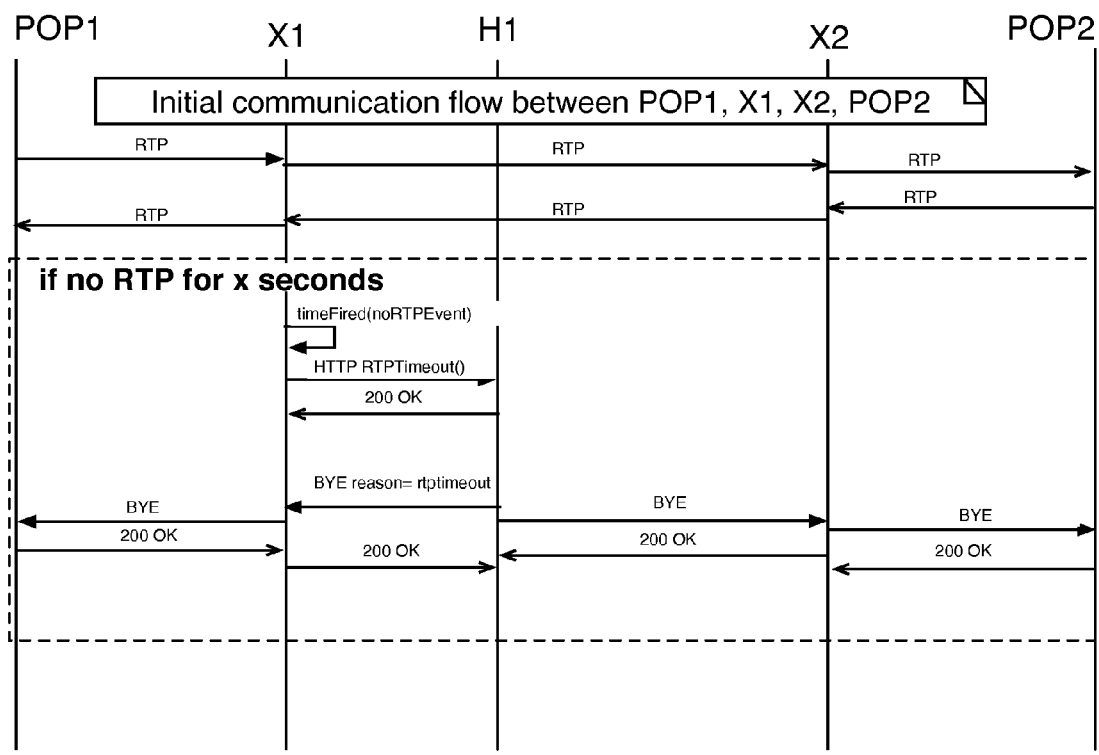
FIGS. 13 and 14 is an exemplary communication flow diagram of a caller or callee timing out.
Figure 14:
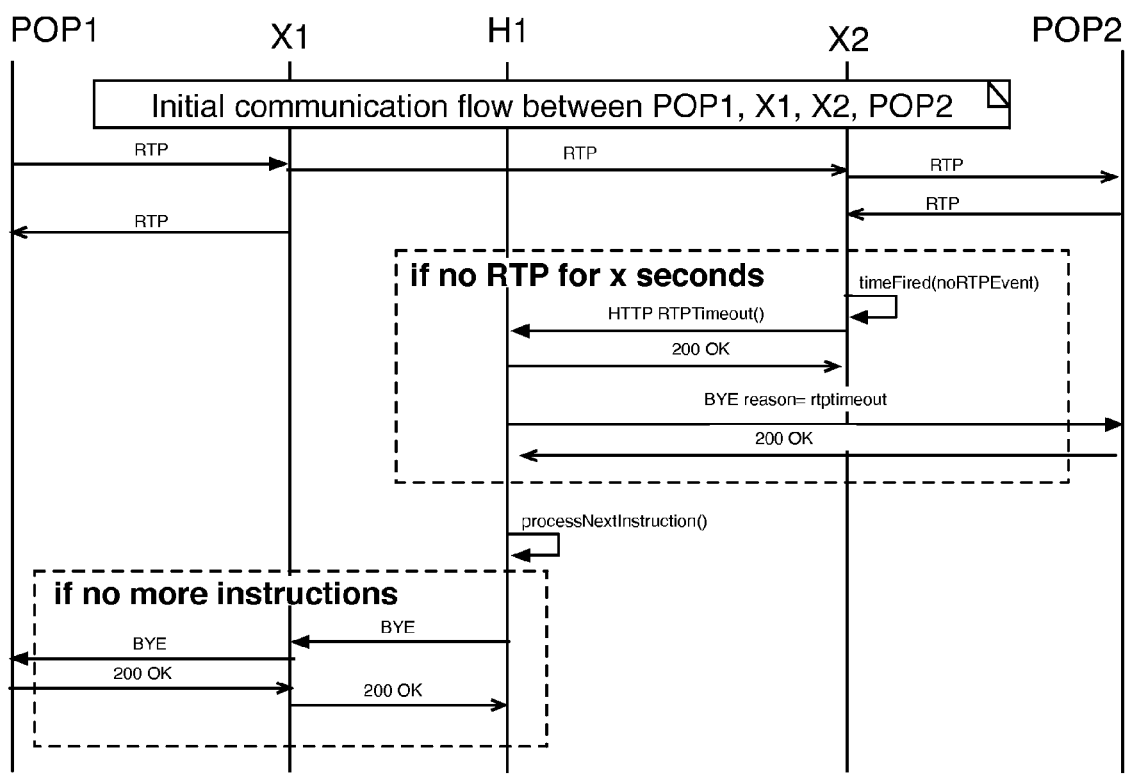

A sixth exemplary implementation of the system and/or method of the preferred embodiment can accommodate timeout scenarios on the caller or callee side. Each communication gateway is preferably responsible for detecting timeouts for their respective leg of the communication. As shown in FIG. 13, the caller side X1 may detect a timeout scenario when the caller endpoint stops sending RTP for a configurable amount of time. X1 then signals the H1 to notify that a timeout has occurred. The H1 will preferably hang up/terminate the caller side and the callee side. The BYE signal preferably includes a header that specifies the reason for the termination (e.g., an RTP timeout). As shown in FIG. 14, the callee side X2 may detect a timeout scenario when the callee endpoint stops sending RTP for a configurable amount of time. X2 signals the error to the H1 and the communication flow is terminated for the callee. As there may still be application instructions that can execute for the caller, the H1 preferably executes any remaining instructions or alternatively terminates communication with the caller.

One or more aspects of the example embodiment can be configured partially or entirely in a computer-readable medium storing computer-readable instructions. The instructions are preferably executed by computer-executable components preferably integrated with one or more APIs, servers, routing policy servers, POP servers, and/or communication gateways. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but the instructions can alternatively or additionally be executed by any suitable dedicated hardware device.

System of Global Media Resources

Figure 15:
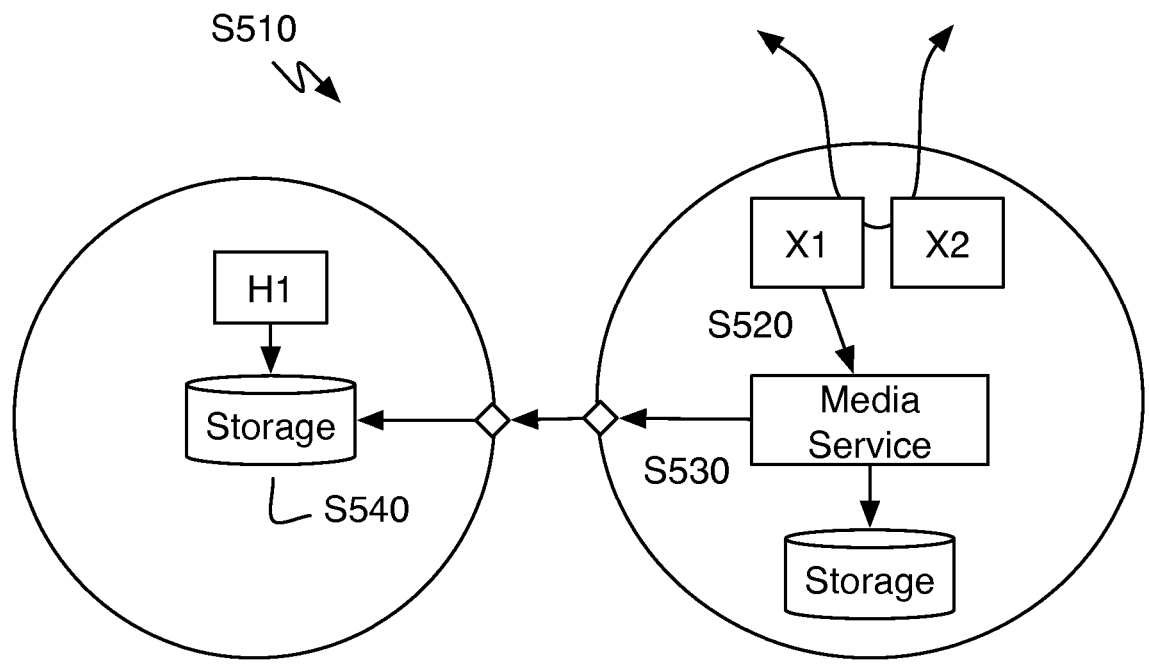
FIG. 15 is schematic representation of a system of a preferred embodiment.

As shown in FIG. 15, a system for processing communication media in a regionally distributed communication platform of a preferred embodiment functions to enable communication media services within a local region. When deploying a communication platform across geographically diverse regions, some services can benefit by having low latency interactions with real-time, synchronous communication. In addition to providing the media services with low latency, the system enables a platform to provide consistent data across the platform. This is beneficial for maintaining consistent API resources. For example, recordings generated in local regions will be available through an API. The method is preferably used in combination with the system and methods described above. The system preferably includes the elements described above for at least two regions. A first region (a local region) preferably includes a plurality of provider services, communication gateways and supplemental media services. The second region (the remote region) preferably includes at least a communication-processing server and any additional resources, services, or components. The remote region preferably includes more resources and services. The remote region can include a core media service, which may be the same as the supplemental media service, but may additionally provide additional functionality such as synchronizing with an API sub-system. For example, API media resources are preferably stored and maintained in the remote region in an API sub-system.

The system and method can be used with any suitable media resource or resources that may benefit from being deployed to local regions. The media resources are preferably configured as a media services. A media service can be easily deployed in a local region and operate independently and consistently integrate with other regions, such as the remote region where API resources and state is maintained. A media service preferably has a defined interface and manages its own high availability load balancing, scalability, redundancy, and other service oriented orchestration considerations. Storage and state can preferably be maintained internally within the media service. For example, a database used to manage the service orchestration of the media service can be kept internally and may, at least in part, not be shared outside of the service. Information, records, and data that is to be shared outside of a media service, is preferably distributed across regions for other services to consume. The media service may include a media service API to facilitate access and integration of the media service with other services and components of a communication platform. Media services are preferably composed of components or computing resources. The components can be software libraries or other services (e.g., a mini-service). The components preferably perform a specific task. Some of these components, which facilitate a particular feature of a service, may or may not be activated or included in a locally deployed media service. For example, for a recording service, transcription may or may not be an included component. Multiple media services may be implemented within a local region, and the media services may target a variety of communication functions. A media service may be a recording service, a text-to-speech (TTS) service, a speech recognition service, a transcoding service, an input detection service, answering machine detection service, a conferencing service, a communication queuing service, and/or any suitable media service.

Two preferred varieties of media services include passive media services and active media services. A passive media service is a media service that acts on the media asynchronously to the media communication path connected to an endpoint, and more specifically, the passive media service immutably operates on the media of the communication session—the media of the communication session is immutable to the operations of the passive media service. Duplicated copies of the media, stored versions of the media, or other secondary instances of the media may be reasonably mutable by a passive media service wherein secondary instances of the media (e.g. a branch or tunnel) can be processed or augmented in any suitable manner asynchronous to the primary media communication route of the communication session. In other words, the media service preferably does not substantially impact the latency of communication of the media communication with an endpoint. A passive media service may process the media after or independent of media communication routing; the passive media service may asynchronously relay a branch of the media to another resource; or the media service may otherwise operate on the media in an immutable and asynchronous manner. A recording service preferably temporarily stores media and then tunnels the media asynchronously (i.e., independent of the media path through the recording service). Some passive media services may contribute some latency to the communication stream, but this is preferably independent of the latency caused from tunneling the media. A speech to text transcription service may generate text from spoken text asynchronous to media passed through the service. An active media service preferably acts and may modify the media in the media communication with an endpoint. An active media service may generate media (e.g., a TTS service), mix media (e.g., conferencing service), and translate/transcode media (e.g. transcode between media codecs and/or mediums). The media communication is preferably mutable. In other words an active media service mutably operates on the media by altering or augmenting the state of the media communication of the communication session. A media service may additionally provide passive and active functionality as a single media service, such as a TTS service with recording capabilities.

Figure 17:
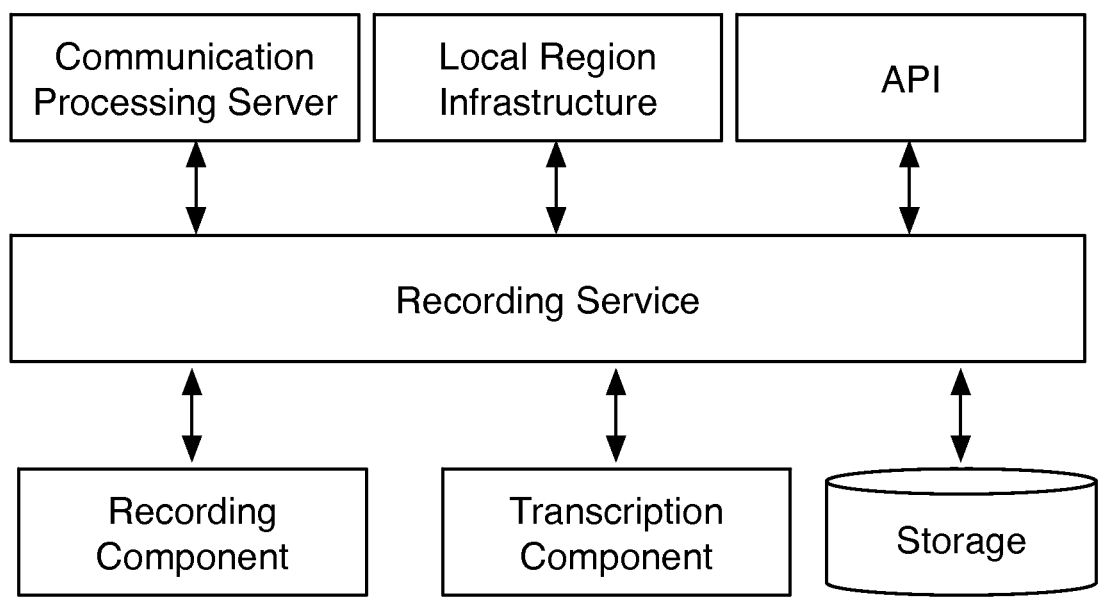
FIG. 17 is a schematic representation of components of a recording service

Recording services preferably enable recording of calls or communication sessions that are routed through communication gateways within the local region. This avoids routing media communication flow through a remote region to access a recording resource. Recording is preferably for audio recording, but may additionally or alternatively include video recording, screen-sharing recording, multimedia recording, or any suitable recording service. The recording service may have additional features that may or may not be integrated into the recording service of the local service. Transcription is one preferred feature of the recording service. Transcription may use algorithmic speech recognition techniques, automated manual transcription, semi-automated techniques, and/or any suitable approach. The audio recording files, the meta data of the recording (e.g., timestamp, time duration, audio quality and format), and/or the recording transcripts are preferably synchronized with a remote region. As shown in FIG. 17, a recording service preferably includes a recording component, a transcription component, and at least a storage component. The recording service additionally includes communication interfaces with a communication-processing server (e.g., a call router), API, and the resources of one ore more regions.

The recording component is preferably responsible for taking a stream (audio, video, etc.), manipulating the stream (e.g., trimming off silence, transcoding it to a different format/codec, etc.,) and writing the recording to a file. Inputs for the recording component may include the audio stream, the file name, and/or arguments for trimming, file format, recording quality, volume adjustment, and/or any suitable parameter of the recording. Outputs of the recording component preferably include an audio stream saved as a file, meta data such as the duration of the saved audio file, and size of the file. The transcription component can include inputs such as the audio stream, transcription arguments, an HTTP callback to call when transcription is complete, and/or any suitable parameter. The transcription arguments may include the accuracy level of the transcription (e.g., level of service), language of transcription, and/or any suitable variable of the transcription process. The transcription component preferably outputs the text of the stream. An interface of the recording service preferably abstracts away the inner-workings of the components of the recording service. The interface of the recording service uses inputs of a recording ID, an audio stream to record, and/or a HTTP callback to call after complete. In one variation the HTTP callback is called after transcoding of the recorded file is complete. Other inputs and parameters may additionally or alternatively be exposed of the recording service. Additional inputs may include transcription inputs such as if a recording should use transcription and the parameters of the transcription. The recording service interface preferably outputs a URI or alternative resources address of a recording, parameters of the recording (e.g., duration of the recording, timestamp), and/or file parameters such as file size.

A Text-to speech service preferably generates, plays, and/or converts text into audible speech. The audible speech is then played within a communication stream. For example, a phone call may connect to a telephony application that specifies a script that should be read to the caller. The script is preferably directed to the TTS service to be played during the phone call. The text-to-speech services are preferably for audio communication. However, a computer generated video simulation or rendering of a speaker may additionally be created for video communication. The text-to-speech service preferably takes text as an input and outputs an audio stream and/or an audio file as an output. The audio file may be cached internally within a local region implementation of a media service. The audio file of a TTS request may additionally be synchronized with a TTS cache of a remote region.

A speech recognition service is preferably a service used in collecting spoken input and converting it into a format for transcription, natural language processing, or interpretation of responses. The speech recognition may use the transcription component described above, but may alternatively use an alternative approach. The input to the speech recognition is preferably an audio stream and parameters of speech recognition. Parameters of speech recognition may include expected language of speech. In one variation, the speech recognition service is used to detect or identify categories of responses. For example, the speech recognition may be used to identify a number with a set number of digits, to identify particular key words, or classes of responses. In one example, classes of responses may include a confirmation class and a cancel/deny response. The output may be the interpretation of the speech. In one variation, an HTTP callback may be specified where the output may be posted after speech recognition is completed. In another variation, the speech recognition service may work in cooperation with the recording service. Alternatively, a speech recognition component may be integrated into the recording service, an input detection service, and/or any suitable service.

A transcoding service functions to convert between formats. The transcoding may convert an active media stream to another format. For example, a call with two endpoints may natively use two different codecs. The transcoding service may convert one or two of the legs of the communication to a common or compatible media stream format. Additionally, the transcoding service may work to convert accessed media resources that are or will be used in a communication session. For example, an MP3 file accessed from a URI may be converted to a wave file for playback during a phone call. The transcoding service preferably accepts a media stream in a first format and outputs a media stream in a second format. The transcoding preferably is used on communication that flows within the local region. The transcoding service may additionally be used if communication flows between two different local regions (as opposed to including a third remote region just for the transcoding service).

An input detection service functions to gather inputs of a communication device. Preferably the input detection service collects DTMF inputs from a user. In the DTMF input detection variation, an audio stream and parameters of detection are preferably an input to the service. Parameters of DTMF detection can include timeout, a key to finish detection on, number of digits, a callback URI to call after input is captured, and/or any suitable input. As an additional service, an answering machine detection service may be used to identify an answering machine. The components of an answering machine detection service may alternatively be integrated into the input detection service or any suitable service.

Conferencing services preferably facilitate calls with more than two endpoints connected. Various features of conference calls may be enabled through components of conferencing services. Additionally, a conferencing service may generate accessible API resources that can be used by applications to programmatically query and modify aspects of in-progress or past conference calls. The API resources are preferably streamed or transmitted to a remote region where consistent representations of API resources are managed for a platform. This preferably functions to make API resources to be regionally/globally consistent despite media services handling communication processing within a local region. For example, a conference call may be in progress in Europe. The communication is preferably routed between multiple European endpoints, possible communication gateways facilitating the signaling, and a conferencing service in the European region. Data for conference call API resources is preferably communicated back to a remote region that is used in managing the API resources. Now if an application anywhere in the world queries for the in-progress conferencing resource and modifies the resource, that occurs on a platform consistent version of the API resource. The synchronous communication preferably avoids increased latency that may occur if the communication was routed to a remote region to a conferencing service, but the API resources used to programmatically interact with the conference call are maintained consistent in the platform.

A communication queuing service functions manage phone queues or, in other words, communication holding lines. Similar to the conference call above, API resources for querying and managing a call queue may be accessible within the platform. The data to support such API resources is preferably synchronized with the platform services and components in a remote region.

A core media service functions to provide functionality of the media service in a central or core region. The core media service may be a super-set of media processing features than those of a local region, but may alternatively provide substantially identical media processing functionality. A core media service can preferably coordinate with a local media service in synchronizing API media resources. For example, a recording media service may locally temporarily store a copy of the media in the local region in case a failure occurs in communication with the remote region. Then the media communication is streamed or otherwise communicated to the core media service to synchronize with the API sub-system. The API sub-system preferably includes the API services to support processing API calls. The API sub-system additionally includes media storage systems. In the recording example, a copy of the recording is preferably stored in some media storage solution such as a cloud hosted simple storage solution.

As mentioned above any suitable services may be implemented within a local region. The media services used within a local region depend on the use-case of the communication platform. While any of the above media services or suitable alternative media services may used, the below method primarily uses a recording service as an exemplary media service but any suitable media service may additionally or alternatively be used.

Method of Global Media Resources

Figure 22:
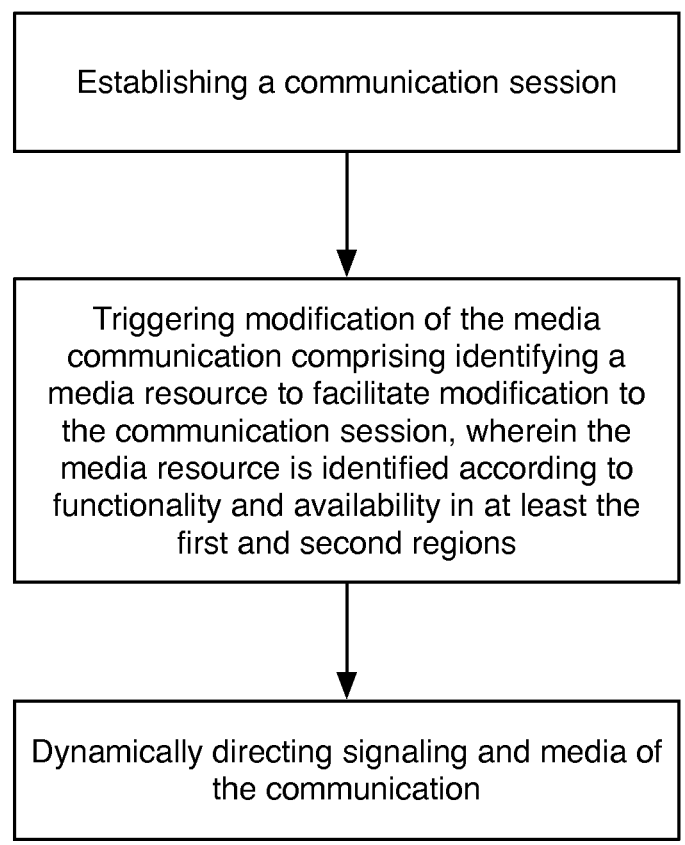
FIG. 22 is a flowchart representation of a method for maintaining media communication in a distributed communication network.

As shown in FIG. 22, a method for processing communication media in a regionally distributed communication platform with at least a subset of resources in a first region and a subset of resources in a second region of a preferred embodiment can include at the first region, establishing a communication session; triggering modification of the media communication comprising identifying a media resource to facilitate modification to the communication session, wherein the media resource is identified according to functionality and availability in at least the first and second regions; and dynamically directing signaling and media of the communication. The method preferably functions to improve communication quality in regionally distributed communication platforms. In integrated communication platforms, infrastructure may need to be physically present in different regions to support requests associated with the region, however, the capacity, availability, and functionality of media resources may be asymmetric across all regions. That is to say that the resources in one region may be different in a second region. In a preferred implementation, there may be one or more central regions that include a larger set of resources than local regions, which may function to support communication in that region.

As discussed herein, establishing a media communication can include establishing a media communication and a signaling communication. Furthermore, at the communication session includes at least one connection to an endpoint, but may support multiple endpoints, which may be associated with the same or different regions.

Additionally, dynamically directing signaling and media of the communication preferably includes routing media communication outside of the first region if the selected media resource is outside the first region, and routing media communication through the media resource of the first region if the media resource is available in the first region. The method preferably selects media resources according to communication quality. Communication quality preferably includes communication latency (which may be impacted according to regional association of media resources), post dial delay, jitter, cost to platform, cost to customer, and/or any suitable quality metric.

The method can preferably establish regional communication routing according to various modes of communication network topologies. The use of active media resources can preferably include any suitable mode of communication network topology (e.g., routing media within a single region, accessing an active media resource external to the region associated with the connected endpoints, routing through multiple regions when endpoints connect in different regions, and other suitable scenarios). In the case of passive media resources, branches of the media communication can be transmitted or tunneled to media resources of other regions. Additionally, various combinations and variations of the communication topologies can be dynamically generated in response to different passive and/or active media resource requirements.

Figure 16:
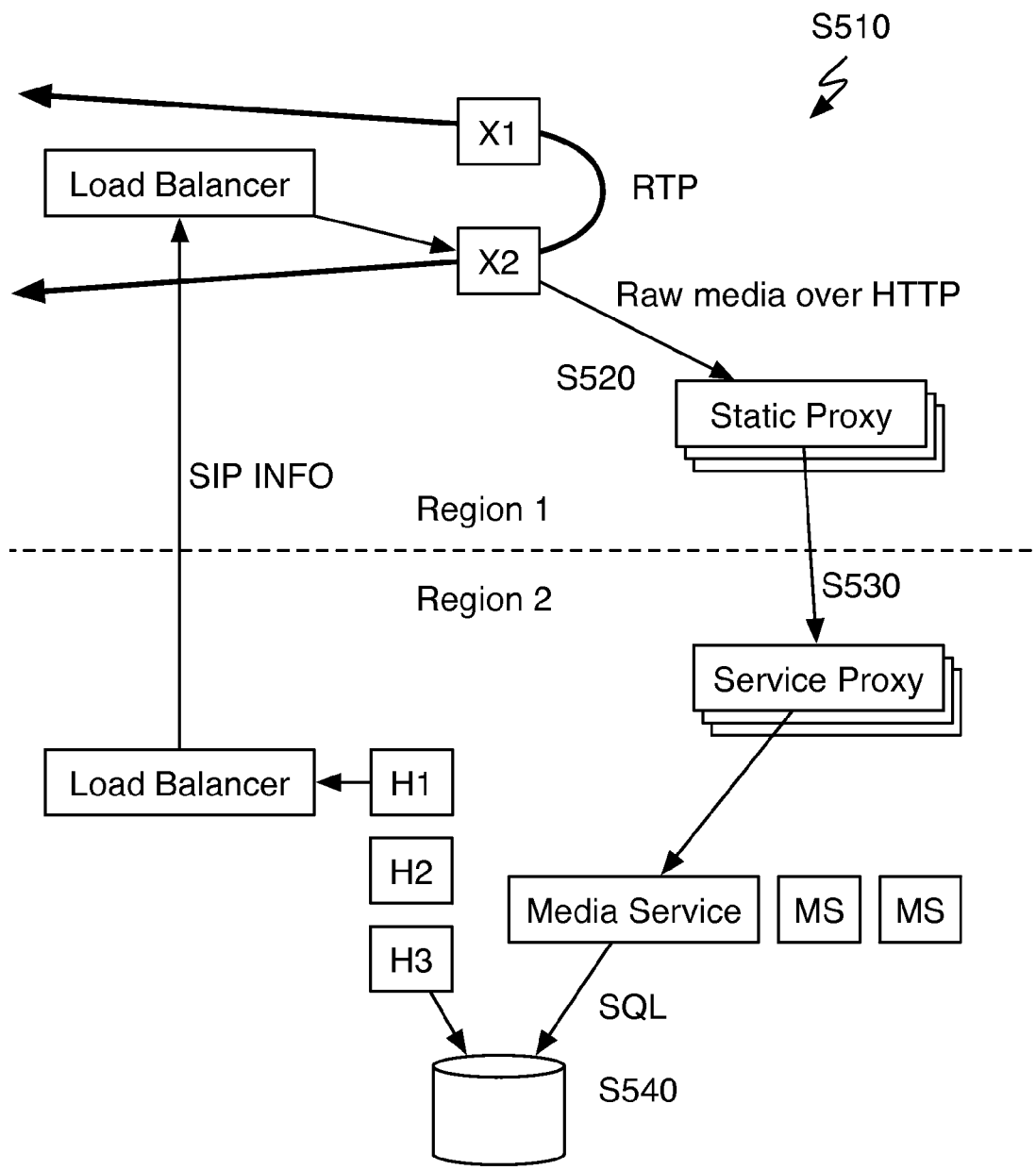
FIG. 16 is a variation of a method with static and service proxies.

As shown in FIG. 16, a service for processing communication media in a global of a preferred embodiment can include providing a communication processing platform with components of at least two regions S510, routing communication to at least one media service of the local region S520, tunneling a media stream to the remote region S530, and storing the data of the media service S540. The method functions to enable communication media services within a local region. When deploying a communication platform across geographically diverse regions, some services can benefit by having low latency interactions with real-time, synchronous communication. In addition to providing the media services with low latency, the method enables a platform to provide consistent data across the platform. This is beneficial for maintaining consistent API resources. For example, recordings generated in local regions will be available through a global API. The method is preferably used in combination with the system and methods described above.

Block S510, which includes providing a communication processing platform with components of at least two regions, functions to dynamically direct communication traffic between two regions. The provided communication processing platform is preferably substantially similar to the system and methods described above. Communication can preferably be routed within a local region if resources are available in that region or communication can be routed between at least a local and remote region to use the resources used during a communication session. Providing communication processing platform may include initializing signaling and media communication flow as described above. The subsequent steps below are preferably used in the context where the media communication flow is established within a local region. In other words, media communication flow is from at least one endpoint through a provider service of a first region and to at least a communication gateway. A one legged variation where only one outside endpoint is connected preferably uses at least one media resource to act as the other endpoint (e.g., play audio and/or collect input). Other variations, preferably involve a communication session having at least two outside endpoints connected. The communication route preferably is from a first endpoint through a provider service to a first communication gateway to a second communication gateway and then through a provider service to the second endpoint. Any suitable number of endpoints may additionally be connected. Additionally, communication is additionally routed to a media service as described below in Block S520.

Block S520, which includes routing communication to at least one media service of the local region, functions to incorporate a media service with active communication. The media service may also be provided by a remote service as well as a local region. A benefit of using the media service of the local region is that latency issues, quality of service, and other issues may be avoided by containing communication flow within a local region. A media service is preferably activated by a communication-processing server (e.g., a call router) of a remote region deciding that a media process should be used. The communication-processing server preferably signals to the communication gateway of the local region to inform the communication gateway that it should use, activate, or enable the media service. Preferably the signal is sent through a SIP control channel using SIP INFO. Additionally, some record within the remote region may initially be created by the communication-processing server. The record may be used in creation of an API resource or for internal logic of the remote region. The record is preferably stored in a database or some other suitable storage mechanism. In initializing the record, some information such as a resource ID or secure ID may be automatically generated before a media service is notified. Record information such as account information, media resource ID, and other instructions may be included in the signal communication to the communication gateway in the local region. For example, if a call router encounters an instruction to record audio. The call router preferably creates a recording resource in the remote region; transmits a SIP INFO signal to a communication gateway managing the endpoint in a remote region, wherein the SIP INFO also includes recording instructions, the resource ID and account information.

The communication gateway preferably activates the media resource by connecting the communication stream to the media service. Depending on the type and use-case of the media service, the media service may be an intermediary service, a side service or an endpoint service. As an intermediary service, the media communication flow passes through the media service. This may include a transformation of the media stream between different legs of the communication. For example, a transcoding service may convert the communication stream to a common compatible media format. A side service is preferably an passive or ancillary service that has a communication stream pushed to the media service. The communication stream may be transmitted asynchronous to the media communication connected to the endpoint. As being transmitted asynchronously, any latency or delays in the media transmission is preferably independent of such issues with the communication quality experienced by connected endpoints. The media service may be passively observing the communication stream such as in the case of a recording service. The media service may alternatively actively interact with the communication stream such as if an input service signals the communication gateway that an input event was detected. The media service may additionally be a communicating endpoint of the communication session. For example, a media service for playing audio files and/or performing speech recognition may act as one leg of a phone call. In the case of a recording service, the two streams of a media communication are preferably merged and pushed to the recording resource over HTTP. The stream is additionally stored in local disc of the local region. The local disc storage functions as a backup in case of failure. In one variation, the media service of the local region is implemented as a static proxy of the media service and the media stream is tunneled from the static proxy to a service proxy and media service of a remote region as shown in FIG. 16. A static proxy of a media service may provide temporary storage or processing capabilities. Long terms data and more complicated asynchronous processing of a media service may be kept within remote regions. The static proxy preferably runs a server mode tunnel service (e.g., stunnel) and a load balancing service.

Block S530, which includes tunneling a media stream to the remote region, functions to transfer data for persistent storage in the remote region. Tunneling to the remote region is preferably used to update records in the remote region. There may be several ways to accomplish this. A first variation include tunneling of a media stream may include establishing VPN proxies that function to get around firewalls. A firewall for HTTP is preferably opened to enable servers of the local region push media streams to media services of the remote region. As described above, service proxy servers may be implemented within the remote region to receive incoming SSL-encrypted connections from local regions, terminate the SSL, and forward requests to an appropriate media service of the remote region. Another variation may include cutting database dependence of a media service and promoting a resource of the remote region to update the database. Data generated in the media service is preferably streamed from the local region to the remote region. In one variation, an existing SIP channel may be used as the signaling and media channel for streaming media to the remote region. Special handling of SIP failures or media processing failures may used to ensure updating of the database. Another variation would be to open up firewalls for the databases with records used by a media service. Measures are preferably with the communication link between the regions to avoid a security risk of opening up firewalls for the databases.

Block S540, which includes storing the data of the media service, functions to store the data of the media service in a consistent and accessible manner. The data is preferably stored within a remote region that is used at least in part as a core, central, or main sub-system of the platform. The remote region will preferably be a region where at least part of state data of the platform is kept. There may need to be numerous local regions deployed to service different geographic regions. However, replicating and making the data consistent across each region increases complexity and cost of the platform. A subset of the regions, possibly even one or two regions, is preferably used as the central region where persistent data is stored. The persistent data may be used within logic of the platform or alternatively used as accessible resources available through an API, user interface, or other suitable interface. Once the data from the media service of the local region has completed, the communication-processing server will preferably signal back to the local region over the signaling control channel to stop the recording. Alternatively, a media service in may signal to the communication gateway, which may contact a component of the remote region to indicate that the storing of the persistent data is complete. While storing of persistent data is used for some media services, some media services may not generate persistent data that requires storing outside of the local region.

As shown in FIG. 16, an implementation of the method may include media communication being established within a local region as described above. A call router of a remote region may determine that a call should be recorded. To initiate recording, the call router creates a new recording record in a database, and uses SIP as a control channel to send a SIP INFO signal to a communication gateway in the local region. The SIP INFO preferably includes information of a recording request such as the account name and recording record secure ID. The communication gateway then merges streams of an active call within the first region and pushes the merged media stream over HTTP. A temporary or cached version of the recording may be stored locally. A static proxy component preferably uses the host header and pushes the stream to a service proxy. The service proxy is preferably configured to listen for changes in platform orchestration to determine the load balancing and media resources available.

Method for Managing Communication in a Distributed Communication Network

Figure 18:
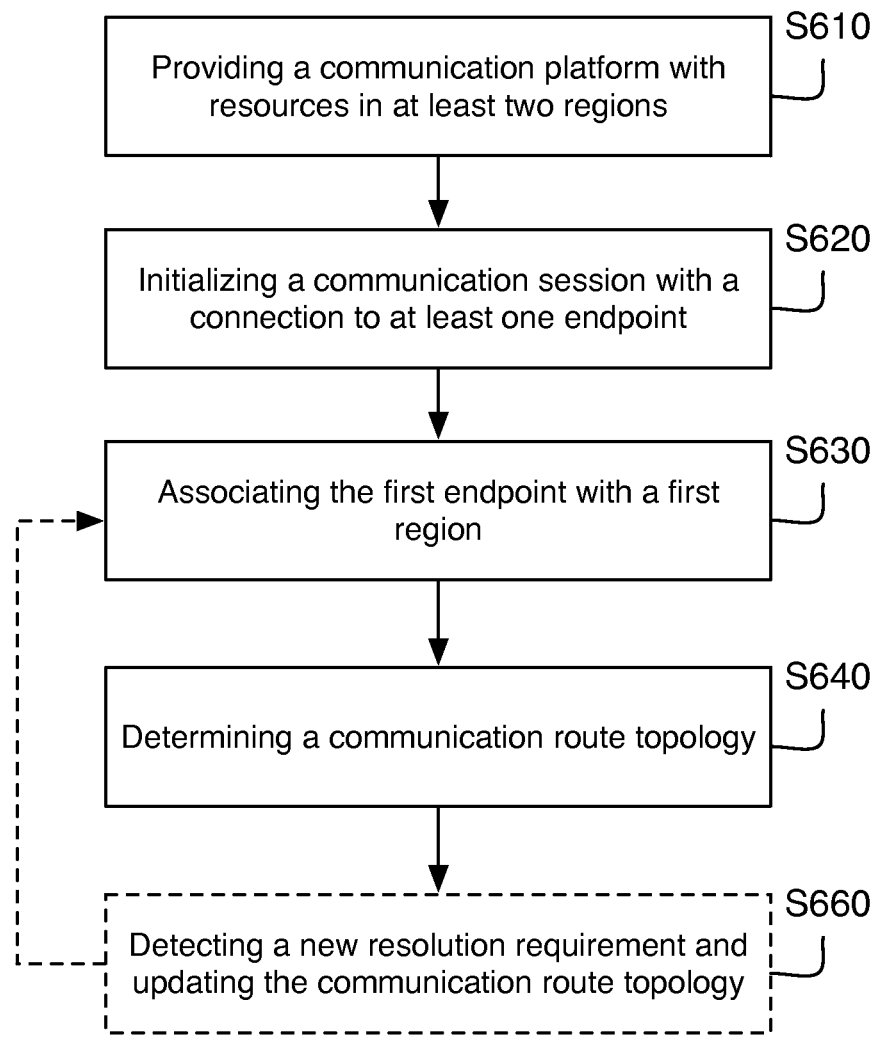
FIG. 18 is a flowchart representation of a method for managing communication in a distributed communication network.

As shown in FIG. 18, a method for managing communication in a distributed communication network of a preferred embodiment can include providing a communication platform with resources in at least two regions S610; initializing a communication session with a connection to at least one endpoint S620; associating the first endpoint with a first region S630; determining a communication route topology S640; and establishing the communication route topology S650. The method functions to dynamically redirect communication traffic within communication platform for signaling and media. The method is preferably employed in a regionally/globally distributed communication platform that works with communication susceptible to latency and/or quality performance issues. The method is preferably used within a communication processing platform such as the telephony platform incorporated by reference above. The method may additionally or alternatively be used with video communication, client based audio communication (e.g., VoIP), screen-sharing applications, over-the-top (OTT) IP communications, and/or any suitable communication platform. As described above, replicating all components in different regions can be expensive and increase complexity of a system. The method enables communication to be re-routed within different modes of routing topologies according to requirements and quality improvements for a particular communication. Generally, different regions will have different media processing and/or signal control capabilities, and additionally, each communication may further have different and changing media and/or signaling resource requirements. The method preferably provides capability to route media according endpoint regional association and resource capability requirements of the communication session. More preferably the media and signaling are both routed, and routed independently.

Block S610, which includes providing a communication platform with resources in at least two regions, functions to have a communication platform with at least two regions of resources. The different regions are preferably substantially similar to the regions described above. The regional centers are preferably hosted within distributed computing systems based in particular geographic regions. The regions of the communication platform are preferably at least partially co-dependent, in that at least one or more resources are shared between the two regions. In a preferred implementation, a central core region, will maintain core resources such as communication-processing servers. There may be a single core region, which in one implementation maintains the official state information within the platform (e.g., maintains the consistent source of API resource information for various accounts). There can additionally be multiple core regions. Synchronizing resources can be used to keep data and state of the core regions in synchronization. Local regions are preferably deployed to serve communication requirements in particular geographic regions. The local regions may not include a full set of resources to handle all communication capabilities of the platform. Additionally, different local regions may have different levels of communication capabilities. As described above, the local regions may additionally include local instances of a resource that operate in cooperation with core regional instances of the resource. For example, a local recording resource may facilitate recording in the local region (avoiding latency issues), while tunneling the media to a core recording resource to store as an API resource. The regions can include different sets of media processing resources, signaling resources, storage/state information, platform services (e.g., API servers, etc.), and/or any suitable type of resource.

Block S620, which includes initializing a communication session with a connection to at least one endpoint, functions to establish a communication with at least one outside initiator or receiver of the communication. The initiated transaction may be transacted (e.g., originated, terminated, or otherwise connected) with a PSTN provider, a SIP provider, a IP communication provider, client application, a WebRTC communication source, or any suitable communication provider.

In one preferred variation, the communication session is initiated from an incoming communication request. The incoming request may be received from a PSTN provider, a SIP provider, an OTT IP communication provider, a client application, a WebRTC provider or service, and/or any suitable communication provider. In the case of a client application, the incoming request from the client application may be an API request from a client endpoint (e.g., a mobile app used as a communication device). In the case of an incoming request, the calling endpoint is connected to at least one media endpoint (e.g., a TTS server) within the communication platform or alternatively to at least a second external endpoint. The first, second, and/or optionally other endpoints may be the same type of endpoint or may be different endpoints. A subset of the endpoints may be endpoints associated with the same region or, alternatively, different regions.

In other instances, the communication session may be initiated in response to an outgoing communication request. In this variation, the communication is established from the communication session, and will preferably include calling out or inviting at least one external communication endpoint. As with the inbound communication, the outbound communication may be between one endpoint and an internal media service or between at least two external communication endpoints. The outbound communication session may be initialized in response to an API request. For example, an account may make a REST API request to setup a call between two endpoints. The outbound communication session may alternatively be in response to application processing, part of a scheduled event, or in response to any suitable trigger. In many cases, the communication session will be modified such that the involved endpoints change during the session, preferably through merging incoming and/or outgoing communications. For example, an inbound call may be redirected to connect to another external endpoint; two inbound calls may be merged in a conference; or outbound calls may be merged in a conference.

Block S630, which includes associating the first endpoint with a first region, functions to establish or determine a regional relationship of involved endpoints. The endpoint is preferably associated with a region according to regional information encoded in the endpoint (e.g., country code, area code, etc.) or otherwise associated with the endpoint. An endpoint will preferably have a geographic proximity (or alternatively a network-based proximity) to at least one region. The endpoint is preferably associated with the geographically closest region. In some cases, where the distance different between a local region and core regional is negligible (e.g., less than 500 miles), then the association may be biased towards the region that better meets the communication resource requirements. For inbound communications in particular, the regional association is preferably based on the provider resource through which the inbound communication is received. For example, a PSTN provider that serves a particular region is preferably configured to bridge communications to the communication platform in a designated region. Similarly, when making outbound calls, the area code or country code of an endpoint may be used to determine which region will be used as a connection point to the endpoint. For example, all outgoing calls for endpoints with addressing information associated with a particular region may go through that particular region. Multiple endpoints may participate in a communication session, and each endpoint can be individually associated with a region.

A communication session can include one or more connected endpoints. Each endpoint is preferably associated with a region wherein block S630 may be performed for multiple endpoints. Such region associations can be determined based on acquired metadata stored in association with the endpoint address. Additionally or alternatively, regional information may conveyed through the endpoint address such as in the country code and area code of a phone number, or the domain name used in a SIP address. Such endpoint associations are preferably account for and impact the determination of a communication route topology.

Block S640, which includes determining a communication route topology, functions to query, select, or otherwise determine how at least media is routed within the communication platform. As the communication platform spans multiple regions, the media and/or signaling can be routed in different topologies depending on the communication requirements, regional association of the connected endpoints, and the regional capabilities. The communication route topologies preferably include which resource instances and which regions are used and how the communication is networked between them to connect the endpoints. Block S640 preferably includes determining a communication route topology based on the required resource requirements and the availability of media resources in the regions. As discussed above, communication resources may have different availability depending on the associated regions. Preferably the communication route topology includes the media communication route (i.e., how a real-time media stream is routed). The communication route topology can additionally include a signaling communication route. The signaling and media communication can be facilitated by SIP, but may use any suitable communication protocol. The signaling route and the media route can be independent such that the route of media can be different from the signaling route (even including different regions.

Determining a communication route topology preferably includes determining a route that provides improved communication quality. Preferably the communication quality minimizes communication latency. The communication quality preferably depends on media latency between connected endpoints, but may additionally include other factors such as post-dial delay, jitter, codec quality, platform cost, user cost, and/or any suitable parameter. In one variation, a network graph search algorithm is used to determine the route. In particular, a provider-weighted network search approach can balance a set of different communication quality properties such as the method described in U.S. patent application Ser. No. 14/209,152, filed 13 Mar. 2014, which is incorporated in its entirety by this reference. In an alternative variation, various heuristics based on regional availability of resources is used to default to the nearest resource.

Block S650, which includes establishing the communication route topology, functions to register, negotiate, or otherwise setup the determined communication route topology. Establishing the communication route topology can include negotiating the setup of a media route through a path of the determined path. In a SIP variation, various elements may resources may be invited or subscribe to the media stream. Additionally, media and/or signaling resources may be directed to perform various tasks in association with the communication session. The path will preferably connect the connected endpoint(s) and at least one resource of the communication platform. Other instances may route through multiple resources, establish multiple media "branches", and include various resources.

Figure 19A:
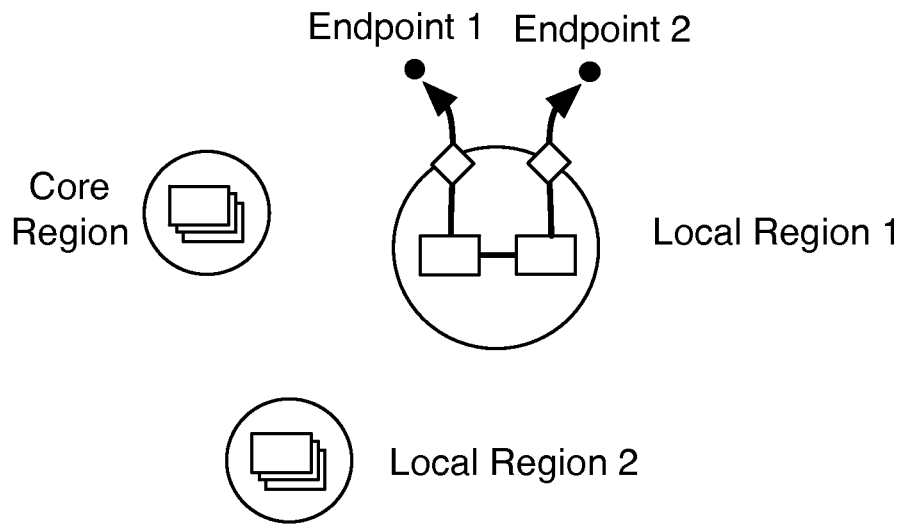
FIGS. 19A-19H are exemplary modes of communication route topologies of various instances.
Figure 19B:
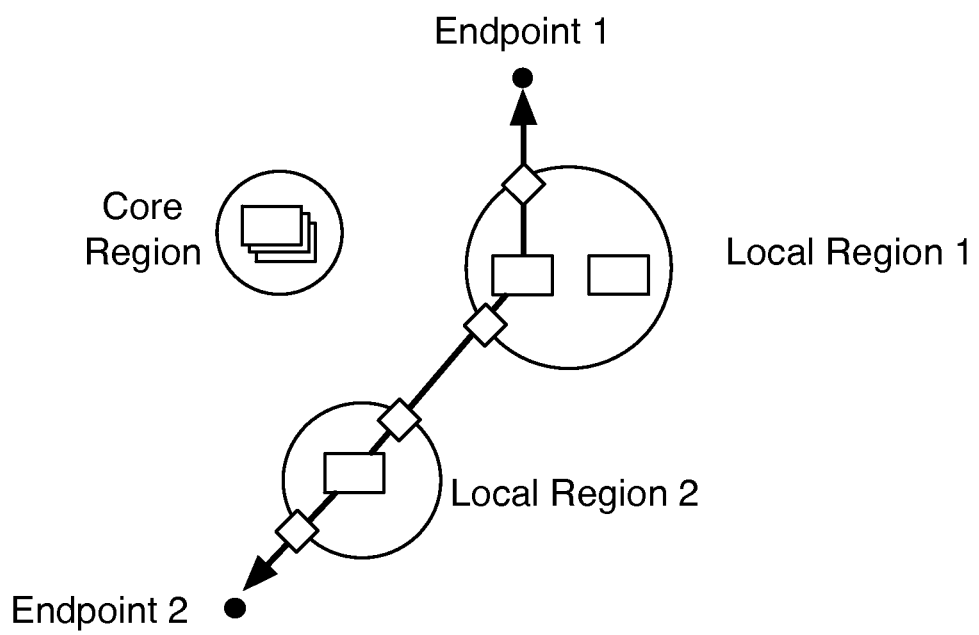
Figure 19C:
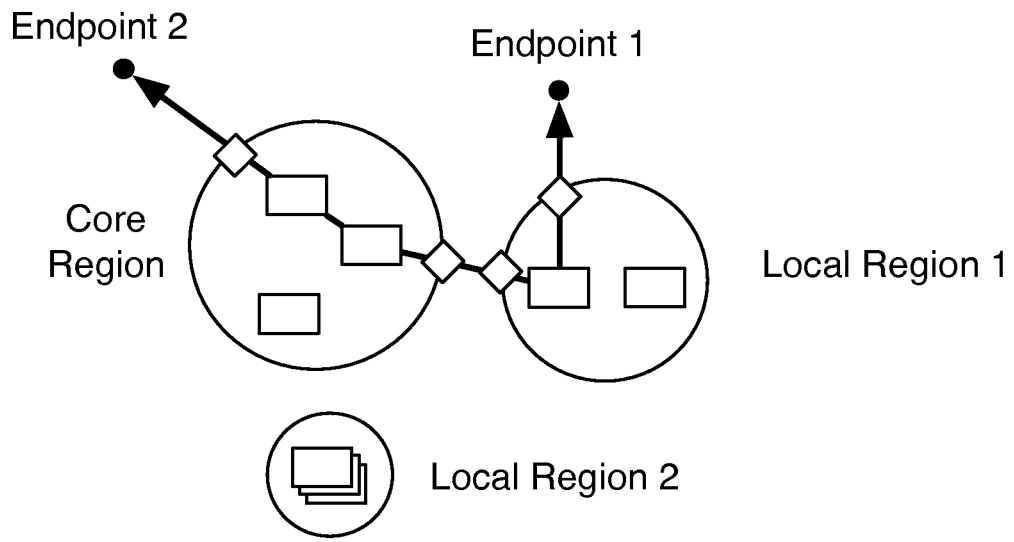
Figure 19D:
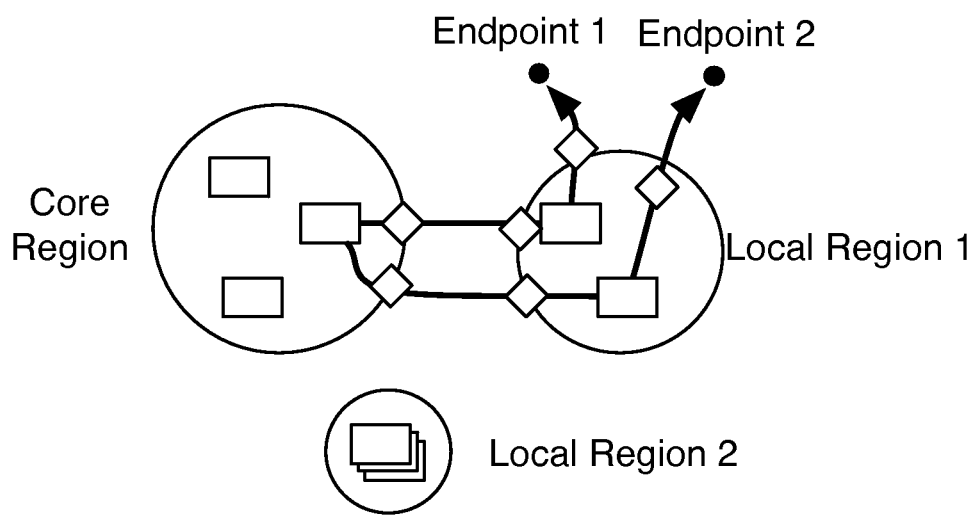
Figure 19E:
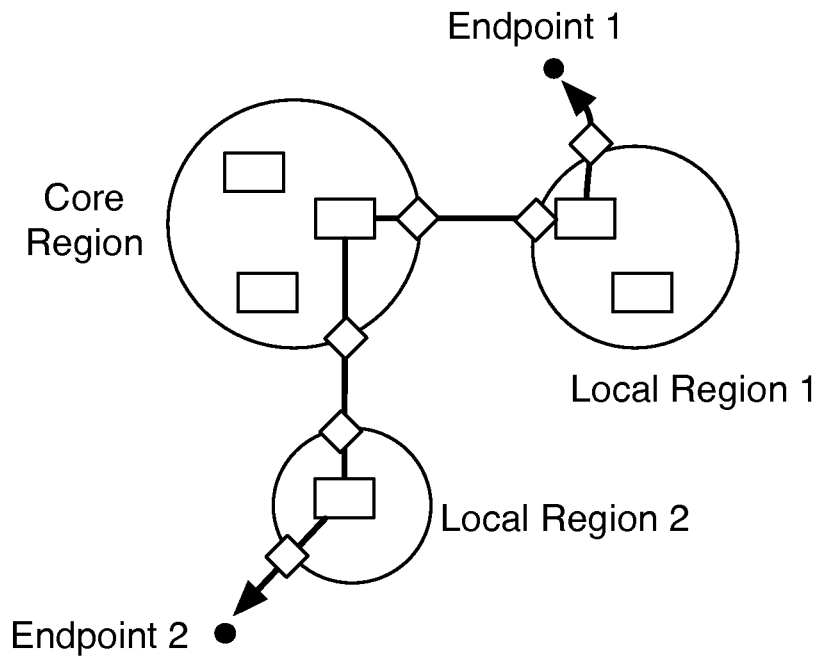
Figure 19F:
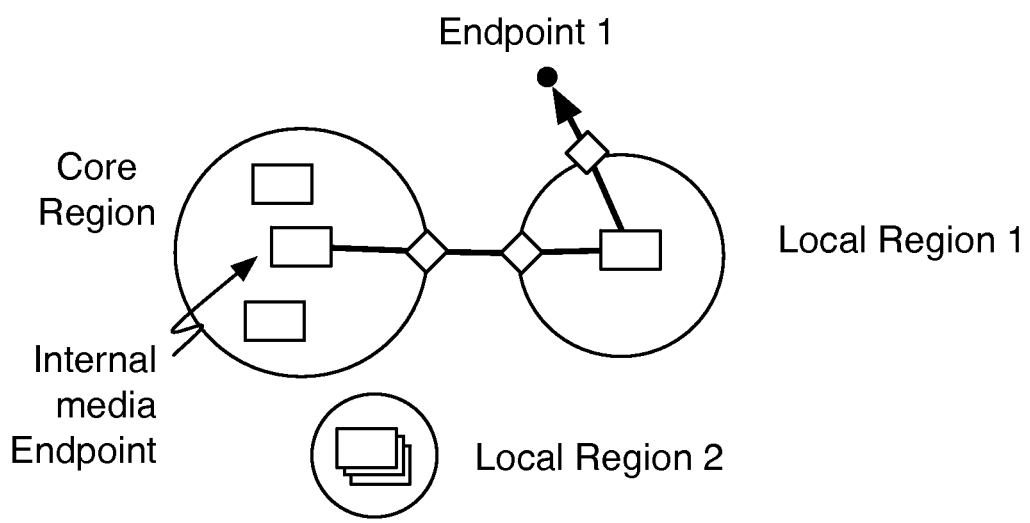

The communication route topologies can specify different modes of operation that are established in block S650. In a local mode, the topology is maintained in the first region. The local mode is preferably used when the resources are available within the region associated with the endpoint(s) as shown in FIG. 19A. For example, if an endpoint from New York is calling an endpoint in Washington, then an Eastern region center may fully manage the communication. In one variation, the communication may be between a first endpoint and a second endpoint, wherein the first and second endpoint are in different local regions. If the communication resources are available in one of the two resources, then the communication may be routed through the two local regions as shown in FIG. 19B. In one variation, a region local to an endpoint can be a core region as shown in FIG. 19C In a remote mode, the topology is through a region outside of the first region. In the remote mode, at least one resource is used outside of the region local to an endpoint. This can include any suitable multi-regional topology. The routing of media through different regions is preferably to access resources not available in the local regions of connected endpoints. In one instance of a remote mode, the topology includes a communication route topology connecting a segment of the route in a first region connected to a first endpoint, a segment through a second region, and a segment in the first region connected to a second endpoint as shown in FIG. 19D. This out-and-back route can be used to access a resource available in a particular region. The second region is preferably selected according to the quality. For example, there may be multiple regions that have the particular resource, but one particular region may be selected according the route topology selection process. In a variation of this route instance, the third segment may be to the second endpoint in a second region as shown in FIG. 19E. In this variation, the first endpoint, the second endpoint, and at least communication resource exist in different regions. In another instance of a remote mode, the communication route topology may include one segment connected to an endpoint in a local region, which is connected to a second segment in a remote region. The second segment can be connected to an internal media endpoint (e.g., a TTS server or media playing server) as shown in FIG. 19F.

Figure 19G:
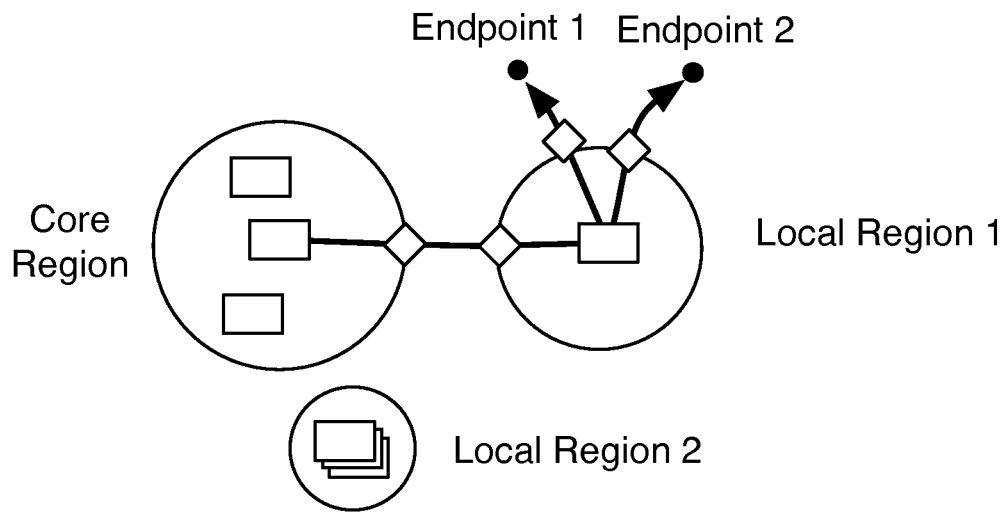
Figure 19H:
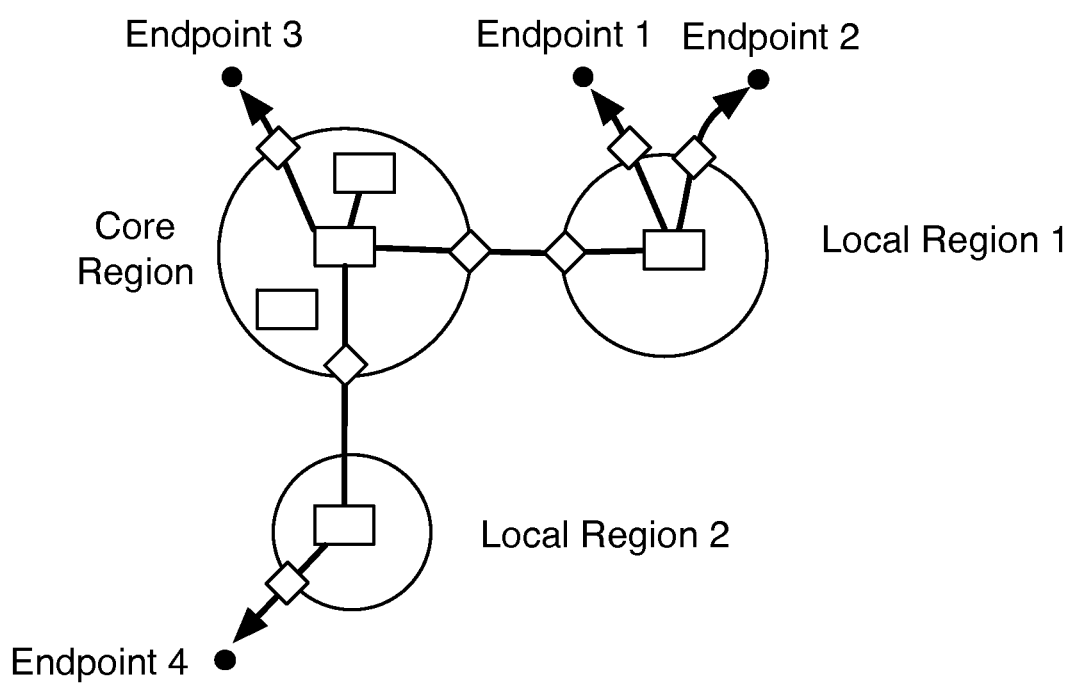

In hybrid mode, may include substantially serving the communication session with resources in a local region while creating a media branch to a remote region as with the recording example above and shown in FIG. 19G. As shown in FIG. 19H, local routing, remote routing, and branching of routes can be used to establish any suitable arbitrary media routing.

Figure 20A:
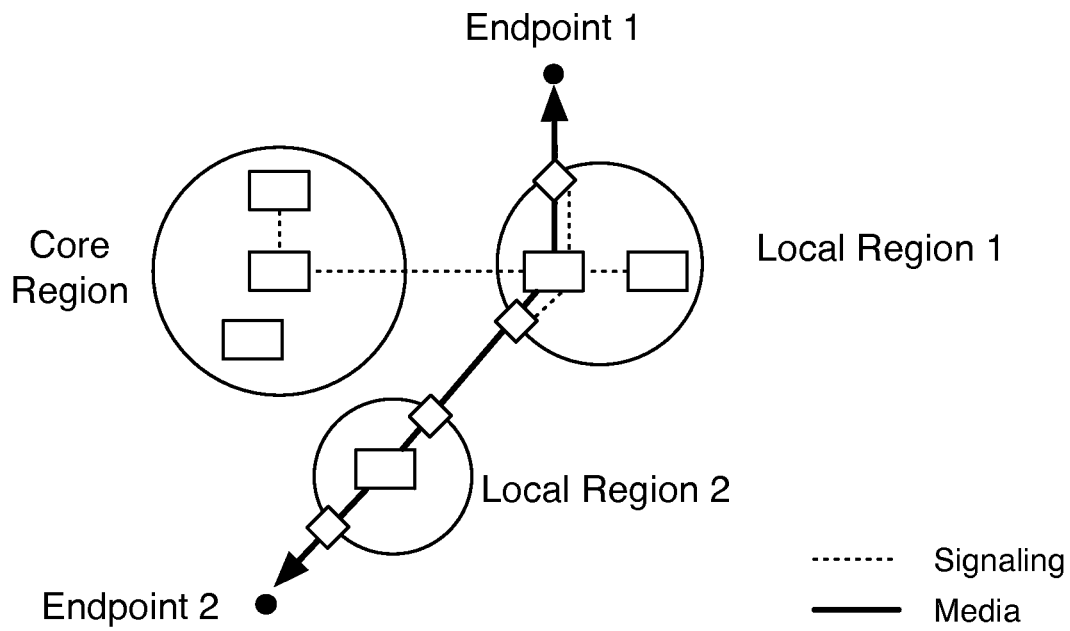
FIGS. 20A and 20B are exemplary media and signaling communication route topologies of various instances.
Figure 20B:
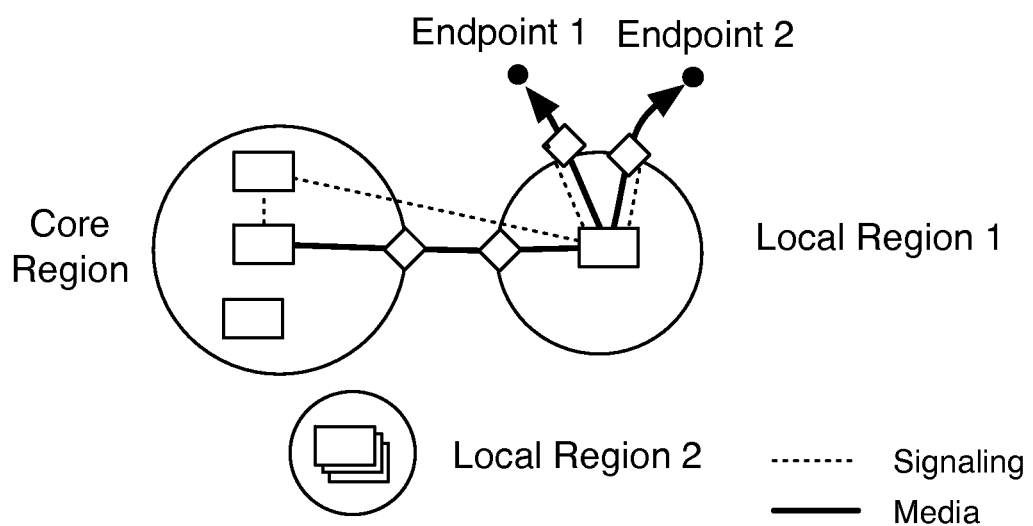
Figure 21:
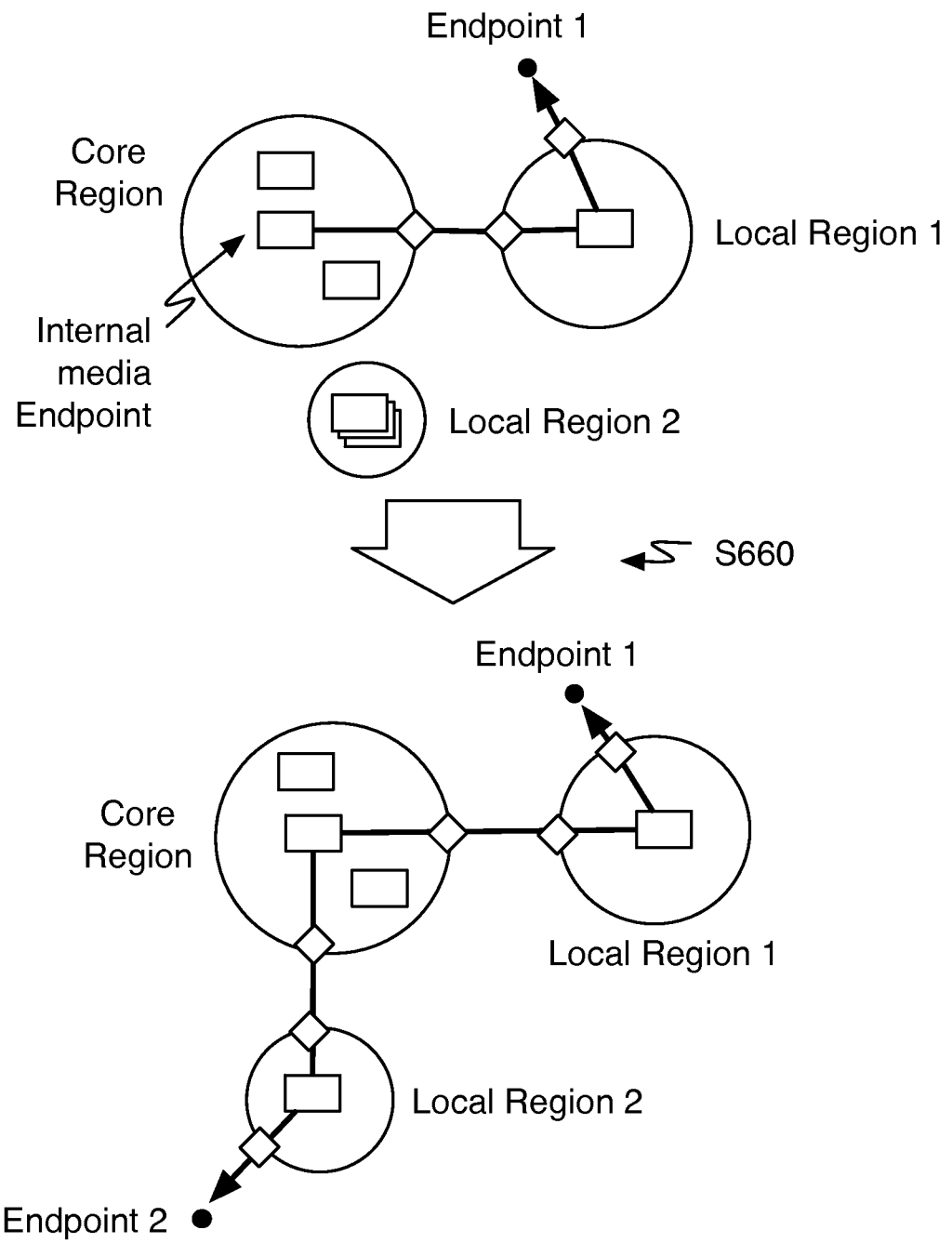
FIG. 21 is a schematic representation of transitioning between communication route topologies.

Communication signal route topology can be similarly be established in any of the suitable variations described above. In one variation, signaling and media are coupled. In another variation, signaling and media are distinct and can have different or identical paths as shown in FIGS. 20A and 20B.

Additionally, the method may include detecting a new resource requirement and updating the communication route topology S660, which functions to transition the communication route topology according to resource requirements. In a communication platform, a communication session may have different resource requirements over the duration of a single session. The communication route may be updated to use different resources, which may result in the media and/or signaling route to have a different path through regions. In other words, the set of resources and the set of regions from one communication topology may be distinct from that of a second instance of the communication topology. For example, a first segment of a session may be simple bridging of multiple endpoints, another segment may require processing application logic of the communication session, and another segment may require the use of a particular media resource (e.g., recording service). Each of these segments can have different resource requirements. The change of resource requirements is preferably identified through the signaling and/or processing of application logic. When a new resource is required, the resource(s) are preferably identified, and then blocks S630, S640, and S650 are preferably substantially repeated to transition the media and/or signaling. Even if a resource was included in the previous route, a new instance of that resource in a different region may be used. Similarly, if resources are no longer needed, they may be removed from the route.

As a person skilled in the art will recognize from the previous detailed description and from the figures and claims, modifications and changes can be made to the preferred embodiments of the invention without departing from the scope of this invention defined in the following claims.

What is claimed is:

1. A method for communicating in a distributed platform comprising:
providing a communication platform with resources in at least two regions, the resources including media resources and signaling resources;
initializing a communication session with connection to at least one endpoint, the communication session communicating media with the at least one endpoint, the media resources in the at least two regions including media services that process the media of the communication session, the media services including:
an active media service operating on the media of the communication session by altering or augmenting a state of the media of the communication session, and
a passive media service operating on the media of the communication session while maintaining a state of the media communication of the communication session;
associating the at least one endpoint with a first region;
determining a communication route topology according to media resource requirements of the communication session and availability of media resources in the regions; and
establishing the communication route topology of the communication session.

2. The method of claim 1, wherein determining a communication route topology further comprises determining a communication route topology according to communication quality.

3. The method of claim 2, wherein establishing the communication route topology of the communication session comprises in a first mode of a communication route topology, the communication route topology is maintained in a first region; and in a second mode of a communication route topology, the communication route topology includes a segment between at least the first region and the second region.

4. The method of claim 3, wherein the communication session is initialized with a connection to at least a second endpoint; further comprising associating the second endpoint with a second region, wherein determining a communication route topology comprises accounting for the regions of the first and second endpoint.

5. The method of claim 4, wherein the first region is distinct from the second region.

6. The method of claim 5, wherein the communication network topology includes a segment through a resource in a third region that is exclusive to the set of the first region, second region, and the third region.

7. The method of claim 1, wherein communication quality is based at least in part on media latency.

8. The method of claim 1, further comprising detecting a new service requirement in the communication session and updating the communication route topology.

9. The method of claim 8, wherein updating the communication route topology comprises transitioning a media communication route through a different sequence of resources in a set of regions distinct from the initial set of regions.

10. The method of claim 1, wherein determining a communication route topology comprises determining a media communication route topology based on media resources in the regions.

11. The method of claim 10,
wherein determining a communication route further comprises determining a signaling communication route topology based on signaling resources in the regions.

12. The method of claim 11, wherein the topology of the signaling communication route topology is independent of the topology of the media communication route topology.

13. The method of claim 1, wherein the communication session is initiated from a communication request.

14. The method of claim 13, wherein the communication request is transacted with a public switched telephone network (PSTN) provider.

15. The method of claim 14, wherein the communication request is transacted with a session initiation protocol (SIP) provider.

16. The method of claim 14, wherein the communication request is transacted with a internet protocol (IP) communication provider.

17. The method of claim 14, wherein the communication request is received in the form of an application programming interface (API) request.

18. A method for communicating in a distributed platform comprising:
providing a communication platform with media services in at least two regions;
initializing a communication session with connection to at least one endpoint, the communication session communicating media with the at least one endpoint, the media services including:
an active media service operating on the media of the communication session by altering or augmenting a state of the media of the communication session, and
a passive media service operating on the media of the communication session while maintaining a state of the media communication of the communication session;
associating the at least one endpoint with a first region;
determining a communication route topology according to media service requirements of the communication session and availability of media services in the regions; and
establishing the communication route topology of the communication session.

19. The method of claim 18, wherein the media services include at least one of Dual-tone Multi-frequency (DTMF) detection, media recording, text-to-speech (TTS), speech recognition, transcoding, input detection, answering machine detection, conferencing and communication queuing.

20. The method of claim 1, wherein the media services include at least one of Dual-tone Multi-frequency (DTMF) detection, media recording, text-to-speech (TTS), speech recognition, transcoding, input detection, answering machine detection, conferencing and communication queuing.

* * * * *